United States Patent
Mayer et al.

(10) Patent No.: US 9,213,836 B2
(45) Date of Patent: Dec. 15, 2015

(54) SYSTEM AND METHOD FOR COMPREHENSIVE GENERAL ELECTRIC PROTECTION FOR COMPUTERS AGAINST MALICIOUS PROGRAMS THAT MAY STEAL INFORMATION AND/OR CAUSE DAMAGES

(75) Inventors: Yaron Mayer, Jerusalem (IL); Zak Dechovich, Jerusalem (IL)

(73) Assignee: BARHON MAYER, BATYA, Jerusalem (IL)

( * ) Notice: Subject to any disclaimer, the term of this patent is extended or adjusted under 35 U.S.C. 154(b) by 3047 days.

(21) Appl. No.: 10/968,022

(22) Filed: Oct. 20, 2004

(65) Prior Publication Data

US 2005/0120242 A1 Jun. 2, 2005

Related U.S. Application Data

(63) Continuation-in-part of application No. 10/301,575, filed on Nov. 22, 2002, now abandoned, which is a continuation-in-part of application No. PCT/IL01/00487, filed on May 28, 2001, and (Continued)

(51) Int. Cl.
*G06F 21/56* (2013.01)
*G06F 21/55* (2013.01)

(52) U.S. Cl.
CPC ............. *G06F 21/56* (2013.01); *G06F 21/55* (2013.01)

(58) Field of Classification Search
CPC ................................ G06F 21/55; G06F 21/56
USPC ....................................................... 726/4, 24
See application file for complete search history.

(56) References Cited

U.S. PATENT DOCUMENTS

| | | | |
|---|---|---|---|
| 4,177,510 A | 12/1979 | Appell | |
| 5,425,102 A | 6/1995 | Moy | |
| 5,440,723 A | 8/1995 | Arnold et al. | |
| 5,511,163 A | 4/1996 | Lerche | |

(Continued)

FOREIGN PATENT DOCUMENTS

| | | |
|---|---|---|
| EP | 0263421 | 4/1988 |
| EP | 0936787 | 8/1999 |

(Continued)

OTHER PUBLICATIONS

A Virtual Operating System Dennis E. Hall, Deborah K. Scherrer, and Joseph S. Sventek © 1980 ACM.*

(Continued)

*Primary Examiner* — Kambiz Zand
*Assistant Examiner* — Benjamin Kaplan

(57) ABSTRACT

In the prior art of computer security by default programs are allowed to do whatever they like to other programs or to their data files or to critical files of the operating system, which is as absurd as letting a guest in a hotel bother other guests as he pleases, steal their property or copy it or destroy it, or have free access to the hotel's management resources. The present concept is based on automatic segregation between programs. This is preferably done by creating automatically an unlimited number of Virtual Environments (VEs) with virtual sharing of resources, so that the programs in each VE think that they are alone on the computer, and (unless explicitly allowed by the user) any changes that they think they made in virtually shared resources are in reality only made in their own VE, while the user preferably has an integrated view of the computer.

13 Claims, 15 Drawing Sheets

Related U.S. Application Data application No. 10/968,022, and a continuation-in-part of application No. 10/644,841, filed on Aug. 21, 2003, which is a continuation-in-part of application No. 10/301,575, filed on Nov. 22, 2002, now abandoned.

(60) Provisional application No. 60/209,593, filed on Jun. 6, 2000, provisional application No. 60/284,019, filed on Apr. 15, 2001, provisional application No. 60/557,453, filed on Mar. 28, 2004, provisional application No. 60/579,148, filed on Jun. 14, 2004.

(56) References Cited

U.S. PATENT DOCUMENTS

| | | | |
|---|---|---|---|
| 5,675,520 A | 10/1997 | Pitt et al. | |
| 5,684,875 A | 11/1997 | Ellenberger | |
| 5,765,030 A | 6/1998 | Nachenberg et al. | |
| 5,832,208 A | 11/1998 | Chen et al. | |
| 5,944,821 A | 8/1999 | Angelo | |
| 6,105,072 A | 8/2000 | Fischer | |
| 6,108,799 A | 8/2000 | Boulay et al. | |
| 6,240,530 B1 | 5/2001 | Togawa | |
| 6,256,773 B1 | 7/2001 | Bowman-Amuah | |
| 6,298,445 B1 * | 10/2001 | Shostack et al. | 726/25 |
| 6,357,008 B1 | 3/2002 | Nachenberg | |
| 6,640,302 B1 * | 10/2003 | Subramaniam et al. | 713/169 |
| 6,813,712 B1 | 11/2004 | Luke | |
| 6,839,850 B1 * | 1/2005 | Campbell et al. | 726/23 |
| 7,089,286 B1 * | 8/2006 | Malik | 709/206 |
| 7,111,173 B1 * | 9/2006 | Scheidt | 713/186 |
| 7,565,692 B1 * | 7/2009 | Maria | 726/23 |
| 2001/0034847 A1 | 10/2001 | Gaul | |
| 2002/0065869 A1 | 5/2002 | Calder et al. | |
| 2002/0124072 A1 | 9/2002 | Tormasov | |
| 2002/0143845 A1 | 10/2002 | Kardach | |

FOREIGN PATENT DOCUMENTS

| | | |
|---|---|---|
| GB | 2391655 | 2/2004 |
| WO | WO 98/45778 | 10/1998 |
| WO | WO 00/16200 | 3/2000 |
| WO | WO 01/25926 | 4/2001 |
| WO | WO 01/61504 | 8/2001 |
| WO | WO 01/75563 | 10/2001 |
| WO | WO 02/061510 | 8/2002 |

OTHER PUBLICATIONS

Jieh-Sheng at. al., A generic Virus detection agent on the Internet (IEEE, 1997).

* cited by examiner

Physical Virtual environment as seen by the segregated programs (each program by default sees itself alone on the computer, with the resources that it is allowed to see)

Actual appearance as seen by user

Outlook VE      Create Space for merge

Sync VE      Visually merged items

ID
SYSTEM AND METHOD FOR COMPREHENSIVE GENERAL ELECTRIC PROTECTION FOR COMPUTERS AGAINST MALICIOUS PROGRAMS THAT MAY STEAL INFORMATION AND/OR CAUSE DAMAGES

This patent application is a continuation in part of U.S. application Ser. No. 10/301/575 of Nov. 22, 2002, hereby incorporated by reference in its entirety, which is a continuation in part of PCT application PCT/IL01/00487 which was filed in Israel on May 28, 2001 (which claims priority from Israeli patent application 136414 of May 28, 2000 and from U.S. Provisional patent application 60/209,593 of Jun. 6, 2000, and from U.S. Provisional patent application 60/284, 019 of Apr. 15, 2001), and which claims benefit and priorities from the following U.S. Provisional patent applications, hereby incorporated by reference in their entirety:
60/344,454 of Dec. 26, 2001
60/371,600 of Apr. 2, 2002
60/371,612 of Apr. 8, 2002
60/417,678 of Oct. 7, 2002
60/419,223 of Oct. 13, 2002
60/424,635 of Nov. 5, 2002

This patent is also a CIP of and claims priority from U.S. application Ser. No. 10/622,841 of Aug. 21, 2003, which is also a CIP of the above U.S. application Ser. No. 10/301,575, and which also claims priority from Canadian application 2,431,681 of Jun. 19, 2003.

This patent application also claims priority from Canadian application 2,446,144 of Oct. 20, 2003, and from U.S. provisional application 60/557,453 of Mar. 28, 2004, and from U.S. provisional application 60/579,148 of Jun. 9, 2004, and from Indian application 1158/DEL/2004 of Jun. 21, 2004, and from British application 0413851.7 of Jun. 21, 2004, hereby incorporated by reference in their entireties.

FIELD OF THE INVENTION

1. Field of the invention

The present invention relates to security in computers (including personal computers, servers, or other computerized gadgets, as explained in the definitions) and more specifically to a powerful comprehensive generic Security System and method for computers, based on automatic segregation between programs.

2. Background

Malicious software attacks on personal computers and/or servers (especially through the Internet) are becoming more and more common and more and more dangerous. According to recent study by the American CSI research institute (The Computer Security Institute), during the last year alone approximately 50 percent of the largest American companies were attacked by at least one malicious Internet software, with an average damage of about 500,000 USD per attack.

For example, according to various estimates, the total damage accrued in 2002 as a result of computer attacks is said to be approximately $47 billion. This high figure confirms that despite the market being inundated with protection techniques, there is still a very real threat with no concrete and lasting solution. In addition, for example a new report by Symantec released on Oct. 2, 2003 found that the number of computers inflicted by malicious software with backdoors that allow remote control or stealing of information has increased by 50% during the first half of 2003.

As the attacks for example by the "I LOVE YOU" virus and its derivatives demonstrate, which affected almost instantly tens of millions of computers and caused estimated damages of more than 10 billion dollars—the conventional anti-virus programs and their methods are inadequate to handle such threats because they are dependent on past familiar code patterns of known malicious software instead of trying to prevent in advance all kinds of attacks in principle. Such attacks are enabled because of an almost infinite number of loopholes and vulnerabilities in operating systems, by the fact that far too many processes occur under the surface without the user's knowledge, and by badly-engineered applications. These loopholes and vulnerabilities include for example:

1. The possibility of attempting to connect from the outside to the user's computer while the user is surfing on the net, without any warning to the user that such attempt is being made.
2. The readiness of certain applications to execute Macro commands or scripts or applets or other executable attachments from incoming e-mail messages or web pages without any warning and without asking for the user's authorization, and without checking what these executables or scripts try to do (if allowed to run).
3. The ability of applications to open a network connection to the outside without any warning or request of authorization from the user.
4. The ability of applications to perform extremely dangerous operations such as for example deleting or sabotaging multiple files or making changes to sensitive system areas or formatting entire drives without warning the user and requesting authorization from the user.
5. Lack of checks against string overflow or buffer overflow in some communication applications so that they can be crashed for example by large strings that contain malicious code that overwrite part of the original program's code and starts running instead of the original code.

Unless these vulnerabilities and loopholes are treated on the most thorough and basic level, and since the Internet keeps growing at an exponential rate and more and more businesses are becoming dependent on it—such attacks may increase in the near future to the point of almost unlimited damages to a very large percent of the computers that are connected to the Internet.

Other methods such as for example packet filtering are also limited in principle, since the rules of which packets to accept or not may contain for example subjective decisions based on trusting certain sites or certain applications. However, once security is breached for any reason, for example due to an error or intended deception, a hostile application may take over the computer or server or the entire network and create unlimited damages (directly or by opening the door to additional malicious applications), which until detected might be already too late to repair. For example, a self-resendable via e-mail macro-virus (such as for example "I LOVE YOU" and its derivatives and similar viruses) can arrive from your best and most trusted friends after their own computer has been compromised. Also, filtering for allowed types of protocols such as for example FTP versus SMTP and so on can be rendered useless by programs that encrypt or disguise a given protocol type to appear as another. Another major limitation of packet filtering is that it can't be relied upon to scan for stolen data in packets, since malicious applications can encrypt the data and/or disguise it to look like something else, so as to appear for example as a gif image.

Antiviruses and firewalls are also not effective against security holes for example in browsers or e-mail programs or in the operating system itself. According to an article in ZDnet from Jan. 24, 2001, security holes in critical applications are discovered so often that just keeping up with all the patches is impractical. Also, without proper generic protection for example against Trojan horses, which can identify any malicious program without prior knowledge about it, even VPNs (Virtual Private Networks) and other forms of data encryption, including digital signatures, are not really safe because the info can be stolen before or below the encryption.

Even attempts to monitor in some ways a certain group of specifically marked executables or applications are limited by nature, because the security breaches can come from many other directions. For example, A Trojan horse may already be lurking in the system for a long time and then suddenly create tremendous damage before being detected, or enter the system any time new applications are installed from any source.

On the other hand, attempts for example to disallow completely any script within e-mail attachments to execute creates too many restrictions and doesn't separate between safe scripts that the user may want to run and scripts that actually try to perform malicious acts.

SUMMARY OF THE INVENTION

The present invention is a novel concept which tries to go deeply into the roots of the causes of above described problems and thus to eliminate completely the above-described problems by creating what is to the best of our knowledge a very powerful, comprehensive, general and generic Security System for computers. This System and method is adapted to protect computers (which may include for example personal computers, servers, and other devices or gadgets with one or more processor that can run programs, as explained below in the definitions) against all kinds of malicious programs that may steal information and/or cause damages including for example changes of data, deletion of data, interfering with function, and so on (such as for example Viruses, Vandals, Trojan horses, Worms, Macro viruses and Malicious e-mails). The system and method can be used in many operating systems, such as for example various platforms of Microsoft Windows, Linux, Macintosh, or other operating systems, eventhough the preferred embodiments use mainly the terminology of Windows, which is the most common and familiar operating system.

The most important principles and objects of this protection system preferably include:
1. Preferably giving the user more information about processes that would normally occur without his knowledge, thus decreasing substantially the chance that malicious software will be able to mislead or deceive the user.
2. Defining preferably comprehensive yet parsimonic sets of rules of appropriate behavior of software so that the system can identify and intercept immediately programs that may be performing or trying to perform suspicious and/or detrimental and/or potentially dangerous activities or not behaving as usual.
3. Monitoring and intercepting and possibly logging all unauthorized and/or suspect activities in the computer and/or asking for authorization or guidance when required.
4. The above-described principles preferably allow multiple safeguards against security threats, so that malicious applications will usually have to break multiple security rules in order to do such things as stealing data, damaging data or propagating themselves, and thus the chance for catching them is much larger.
5. Even if the user allows a certain application to launch another application, the newly launched application or applications are preferably again subjected in turn to all the same monitoring and rules as any other application and/or for example to the limitations that apply to the launching application, so that the scanning for breach of security rules continues to apply at all stages.
6. Since the possibility of encryption by malicious programs which try to steal and send data over communication channels makes it impossible to make sure by monitoring the information flow itself that data is not being stolen—therefore the system preferably relies mainly on allowing the user maximum control over which applications can access which data, which applications are authorized to access which communication channels, and preferably also how much data is actually being sent.

The above protection system is preferably comprised of the following main elements:
1. A monitoring and capturing system, which preferably constantly monitors the security-sensitive elements of the computer system, and most importantly all the relevant peripheral device activities, and preferably especially those related to storage devices (and especially the Hard disk or hard disks) and communication devices (network cards, modem, etc.) and can detect and intercept immediately suspicious or dangerous behavior.
2. The security rules and a database (or databases) for storing the default rules, which preferably contain at least one of: a set of pre-distribution preferably acquired rules that are good for most users of the selected operating system, acquired additional user-defined rules, and statistics of normal or reasonable behavior of programs, which is continuously learned during the operation of the system. This database area, preferably contains also all the authorizations and optionally (in some embodiments) also for example a log of all the questions that the Security System asked the user and his replies (kept at least for a certain period), and when needed, also a log of suspicious activities detected (kept at least for a certain period) and may contain also definable additional logs. The database is preferably encrypted and is considered a constantly monitored high-security protected and preferably backed-up area as defined below in the detailed description
3. A user interface, which interacts with the user preferably in order to at least one of: learn acceptable behavior patterns, warn the user of perceived dangers when needed, and ask for the user's authorization when needed. Preferably it also allows the user to view statistics of behavior of important programs and/or groups of programs and especially programs that are allowed to access communication channels, especially in what is related to sending and receiving data over the communication lines, such as for example since the beginning of the current Internet session or for a certain time period. Preferably, this may also include information such as for example what protocols were used, etc. This means that when looking at the authorizations table preferably the user is shown also for example which programs have been given temporary access rights to the communication channels, and preferably also for example how long ago the temporary or non-temporary permission was given, and/or how much data that program has already sent out and/or for example received, as explained above, etc. This is different from the prior art, in which for example the very popular ZoneAlarm firewall shows near each program an 'X' if it is not allowed to access the Internet, a 'V' if it is allowed, and a '?' if it needs to ask permission (i.e. the user has not asked to remember his last reply), so if the user gives a program a temporary permission, the authorization table still shows a '?' near that program and the user cannot know if the program has or doesn't have temporary access rights at present. This is dangerous since the user might inadvertently answer a prompt from the firewall without paying attention and thus give a program for example temporary access right without intention, but when looking at the authorizations table the user has no indication of this.

4. Preferably the user may also view or modify directly the database of authorizations or at least parts of it.

The main functions performed by Security System:

The main logic behind the rules that define appropriate versus suspect behavior is preventing as much as possible all the elements and activities that are required by malicious programs in order to be able steal any data or do any damage or propagate themselves. The Security System preferably uses a set of heuristics and basic rules for defining suspicious or potentially dangerous activities that are automatically suitable for most users. By using the general default rules and adding to them for example statistical analysis of normal system and applications behavior and what is learned from the user's responses to authorization requests, the Security System quickly learns what is considered reasonable or well-behaved behavior of programs on the user's personal computer or server. Preferably, some of the learning is performed in advance for each operating system and is included in the distribution database, so that the system that is installed by the user has already learned various rules that are relevant by default to most users of that operating system. The security rules and functions performed by the Security System preferably include at least some of the following:

a. Constantly monitoring the security-sensitive elements of the computer system, preferably including all relevant peripheral device activities, and especially storage devices and communication devices, and preferably detecting and selectively intercepting any suspicious or dangerous behavior and acting upon it in accordance with the default and acquired sets of security rules.

b. Default segregation of programs into their natural environments, as defined below in the detailed description. This feature is very important.

c. Preferably warning the user and request for authorization for security-sensitive activities and especially any first-time attempts to access communication channels.

d. Preferably constant and stricter monitoring and protection of areas defined in the various rule sets as higher security areas on the storage media, as defined below in the detailed description.

e. Interception and more explicit warning of the user about potentially highly dangerous activities.

f. Preferably warning the user about significant statistical deviations from normal behaviors of applications and/or of the operating system and especially as relates to suddenly sending out large amounts of data.

g. Allowing the User to request automatic immediate interception and/or warning the user of any attempts of external programs from the network to connect to the user's computer through the communication channels.

h. Preferably allowing the User to request enforcing of general limitations on the communication ports allowed to be opened and optionally also limitations on types of protocols allowed.

i. Preferably monitoring and intercepting as much as possible all attempts of applications to gain direct port accesses to security sensitive devices and especially the storage media and the communication channels.

Therefore, the present invention offers the following main advantages over the prior art:

1. It is adapted to generic detection and interception of all kinds and variations of viruses, Trojan horses, worms, E-mail macro viruses and other vandals even when these are completely new and not similar to other vandals encountered before. Therefore, it can also detect and intercept first strike attacks, instead of waiting for a cure after the damage has already been done to tens of millions of computers.

2. It is not dependent on constant updates of virus knowledge bases, unlike normal anti virus systems.

3. It is not dependent on inherently limited methods, such as for example packet filtering.

4. It preferably offers multiple safeguards against various threats, so that a malicious program will typically have to break multiple security rules (for example, try to exceed its natural environments, try to access any of the communication devices without permission, try modify important system files, try to delete directories, try to modify other executables, etc.), and thus have a much higher chance for being caught. Also, preferably it gives the user more knowledge of what is happening in his system and therefore reduces significantly the chance of the user being mislead or deceived by malicious applications.

5. It is more comprehensive than other solutions and may even at least is some embodiments catch and intercept backdoors that might exist in the operating system itself. Also, it is not dependent on marking a limited group of applications for being monitored, so that all applications are checked, no matter how they are introduced to the system, including if they were there even before the Security System was installed.

6. It is parsimonic in nature, so that it preferably doesn't need specific knowledge about the exact nature of specific programs such as for example various browsers or e-mail programs, and therefore also no updates are needed when the user downloads for example new versions or kinds of Internet applications. However, preferably the security system may incorporate updates and/or other globally-acquired knowledge in order to improve itself.

7. Malicious behaviors of programs can be detected and/or intercepted even if they don't display viral or worm-like behavior at all, for example if a screen saver starts to steal data and send it out over communication lines even if it does not show any attempts to spread itself or to modify system areas.

8. Even systems protected by tight encryption policies, such as for example online banks, are not really safe without the Security System of the present invention, because malicious software, such as for example the Subseven Trojan, can render the encryption useless by sending outside information on everything that is going on in the system at various levels.

9. As one of the consequences of the automatic segregation between programs, if a virus or other malicious program manages to infiltrate the system, it is by default limited to its own Virtual Environment (VE), as defined below in the detailed description, where it cannot cause any damage to the system or to other programs or directories or files As explained below, the automatic segregation is preferably done by creating automatically an unlimited number of Virtual Environments (VEs) with virtual sharing of resources, so that preferably the programs in each VE think that they are alone on the computer, and preferably (unless explicitly allowed by the user) any changes that they think they made in virtually shared resources are in reality only made in their own VE (preferably through Copy-On-Write), while the user preferably has an integrated view of the computer with all the programs installed on it.

Clarification and Definitions

Throughout the patent when variations or various solutions are mentioned, it is also possible to use various combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable sub-combination.

Many times for simplicity of understanding we use terms that are most commonly used within Microsoft Windows environment (which is the most common operating system for personal computers), so it should be kept in mind that in other operating systems such as for example Linux or Macintosh some of these might have different names, somewhat different implementations, etc., although the principles are similar.

As used throughout the present specifications and claims, the following words have the indicated meanings:

"Program", "executable" or "application" is any file or area in memory that contains executable commands, such as for example .exe or .com files, batch files, various Macro files, etc.

"Macro" is an executable written usually in a scripting language and executed by a complex application, such as for example Microsoft's Outlook or Word.

"DLL" is a dynamic link library. This term is common for example in all versions of the Windows operating system. In other operating systems it might have different names but the principle is similar. In general it is a term for a set of routines that can be called from executables, loaded and linked into them during run time.

"Device driver" or "Driver" is a software component that allows an operating system to communicate with one or more specific hardware devices attached to a computer, such as for example a hard disk controller, network card or display card. However, this can include also any software component running in the privileged mode—in the Kernel.

"OS" or "operating system" is software responsible for controlling the allocation and usage of computer hardware resources such as for example memory, CPU time, disk space, and peripheral hardware devices.

"IRQ" or "Interrupt request line" is a hardware line over which a hardware device, such as for example an input/output port, keyboard, or disk drive, can send interrupt requests to the central processing unit (CPU). Interrupt request lines are built into the computer's internal hardware and are assigned different levels of priority so that the CPU can determine the sources and relative importance of incoming service requests. IRQ is an Intel concept to rank Hardware and Software requests according to their importance.

"User" or "users" as used throughout the text are always meant interchangeably to be either user or users. The user or users can be for example the individual user of a computer or computers or a corporation or organization that uses the computers. Therefore, preferably various types of authorizations for example can be given either by the individual user of the computer or for example by the security administrator of the company, or any combination of these. For example some companies might want to give full authority on critical issues only to the system administrator, while others might want to let the employees or certain employees have much more direct control.

"User authorization" as used throughout the text can include also of course additional guidance and options.

"Database" or "Databases" as used throughout the text are always meant interchangeably to be either database or databases.

"Network" as used throughout the text is always interchangeable as either network or networks and represents a connection from a computer (as defined below) by any way to one or more computers or any other compatible communication device.

"File" is one or more areas on one or more disks and may have a definition in the FAT that may be represented as a name, directory, etc. and may have other parameters.

"Registry" is one or more files that may contain operating system and other program settings and mainly managed by the operating system.

"Computer" can refer to a personal computer or workstation or server, or any automated device or gadget with one or more processor or CPU, capable of more than simple arithmetic functions. This can include for example also cellular phones and portable computing devices such as for example a palm pilot. This can include also, for example, computers in cars, which may for example become very important as cars become more automated or even capable of automatic driving, since if hackers are able to damage them for example by Internet or satellite connection, it might even cause life-threatening malfunctions. Other examples can be computers in satellites (In which case, user authorization, when needed, preferably should be requested remotely by encrypted communication with user remote verification), sensitive computer systems in airplanes, etc. So, eventhough we give the examples usually from a PC and Windows perspective, similar principles can be applied also to palm devices, cellular phones, and other types of computerized devices. Also, "computer" or "computers" as used throughout the text are always meant interchangeably to be either computer or computers. Therefore, whenever the word "computer" or "computers" is used throughout the text of this patent, including the claims, it can mean any of the above defined devices.

"Server" is a computer on a network that is running software that provides data and services to clients over the network. The term server can also apply to a software process that similarly sends information to clients and that appears on the same computer as a client process, or even within the same application.

"Kernel" is the portion of the operating system that manages and controls access to hardware resources. It performs for example: thread scheduling and dispatching, interrupt and exception handling, and multiprocessor synchronization.

"DMA" is Direct Memory Access.

"Image Loading" as used throughout the text refers to an executable code that is being loaded for execution or unloaded/terminated.

"Hooked function" as used throughout the text refers to an executable filtering code placed between the calling code and called function and thus has the ability for example to monitor and/or intercept and/or redefine the function that is being hooked.

"API" stands for Application Programming Interface.

"Disk" or "disks" is short for "hard disk" or "hard disks", unless indicated otherwise. "Disk" or "disks" or "hard disk" or "hard disks" can mean interchangeably either single or plural.

It is to be understood that in the preferred embodiments hard disks are just an example of the storage devices or storage media which the patent summary and other parts of the patent refer to. So throughout the patent, including the claims, where disks are mentioned, it can also refer to other non-volatile storage devices that exist or may exist in the future, such as for example Magnetic RAM (MRAM), or other types of secondary memory which have or will have a similar function to a hard-disk. Similarly, whenever files or directories are mentioned it can also be files or directories on such other non-volatile storage devices.

DETAILED DESCRIPTION OF THE PREFERRED EMBODIMENTS

All of the descriptions in this and other sections are intended to be illustrative and not limiting.

Figure 1:
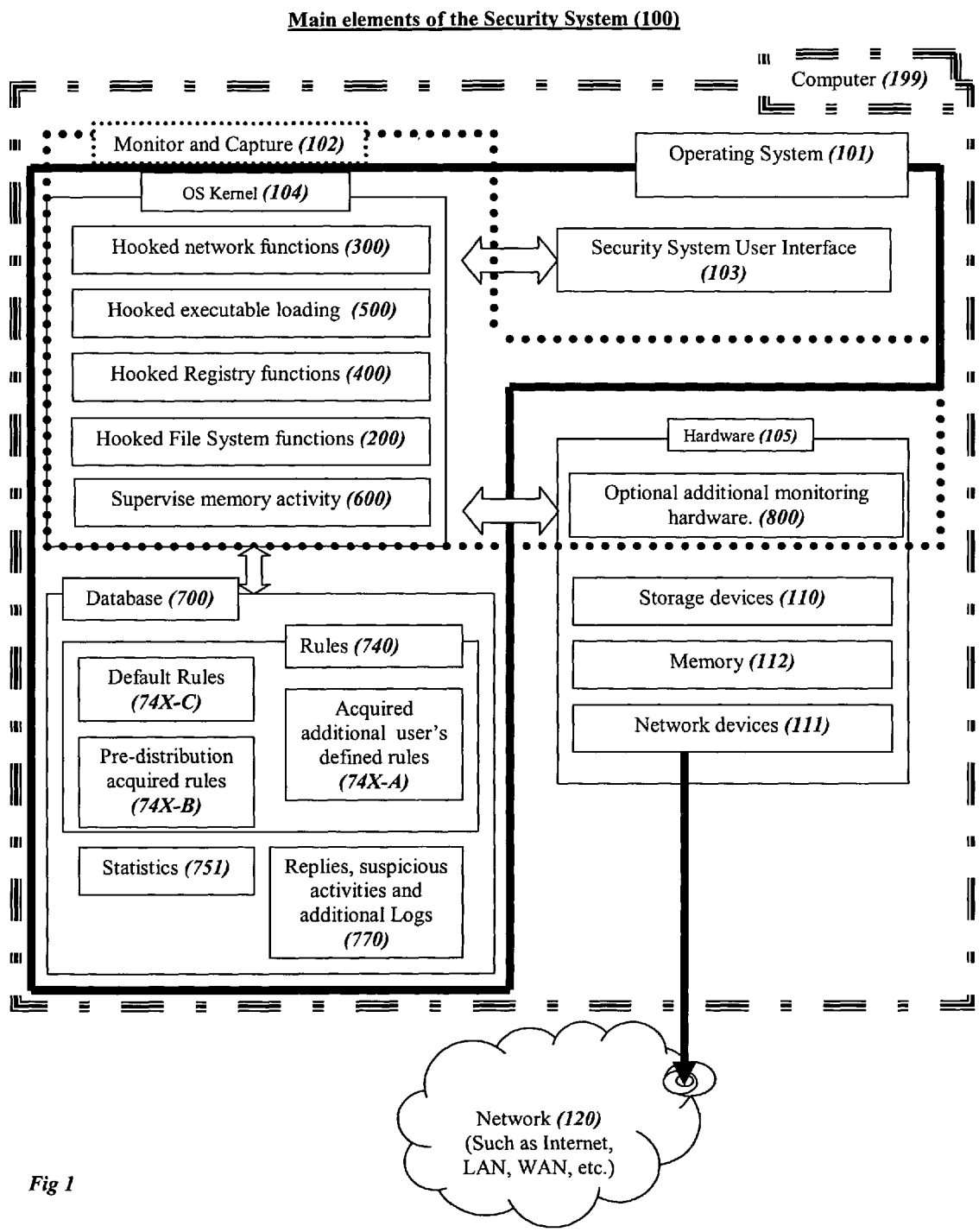
FIG. 1 shows the preferable main elements of the Security System within a typical structure of an operating system in a computer, with some of the hooked peripheral device drivers, especially those related to storage devices and network devices, and preferable places and ways that the various parts of the Security System are coupled to and interact with the above typical structure.

Referring to FIG. 1, we show the preferred main elements of the Security System (100) within a typical structure of an operating system (101) in a computer (which can be for example a server, a personal computer, or other computerized gadgets or devices as explained in the definitions), with some of the hooked peripheral device drivers, especially those related to storage devices (110) and communication devices (111), and preferable places and ways that the various parts of the Security System (100) are coupled to and interact with the above typical structure. The entire system and method can be regarded also as a virtual machine that performs the described functions.

The Security System is preferably comprised of the following main elements:

a. A monitoring and capturing system (102), which constantly monitors the security-sensitive elements of the computer system, and preferably especially all the relevant peripheral device activities and preferably especially storage devices (110)(especially the Hard disk or hard disks) and communication devices (111) (network cards, modem, etc.) and can detect and intercept any suspicious and/or detrimental and/or potentially dangerous behaviors. This element of the Security System preferably installs at least some parts of itself as much as possible in the kernel of the operating system (104), and other parts preferably replace various OS files, such as for example certain drivers, device drivers, DLLs, etc. in order to hook various vital functions. The monitoring and intercepting system is defined in more detail in subsequent figures.

b. Security rules (740) and a database or databases (700) for storing preferably at least one of: default rules (74X-C), a set of pre-distribution preferably acquired rules (74X-B) that are good for most users of the selected operating system, the acquired additional user-defined rules (74X-A), and preferably also the statistics (751) of normal or reasonable behavior of programs, which is continuously learned during the operation of the system. Preferably this database (700) contains in addition to all the authorizations, also an optional log (770) of all the questions that the Security System asked the user and his replies (kept preferably at least for a certain period), and/or, when needed, preferably also a log (770) of suspicious activities detected (kept preferably at least for a certain period) and may contain also for example definable additional logs. The database (700) is preferably encrypted and is considered a constantly monitored high-security protected and preferably backed-up area as defined below. Therefore, all accesses to the database are supervised by the monitoring and capturing system as explained in more detail in FIG. 7.

c. A user interface (103), which interacts with the user preferably in order to at least one of: learn acceptable behavior patterns, warn the user of all perceived dangers and/or ask for user's authorization or guidance when required. Preferably it also allows the user to view for example statistics and/or behavior logs of any program or groups of programs in the computer that the user defines or programs that are considered strategically important such as for example programs that are allowed to access communication channels. For example one of the activities that is preferably being statistically checked and analyzed is the amount and the data that is being send or received, and preferably for example also the protocol that is being used, and/or other data. Preferably the user may also view or modify directly the database of authorizations, or at least parts of it. Preferably, the user may also choose the security software's tightness at a certain range of severity.

Figure 8:
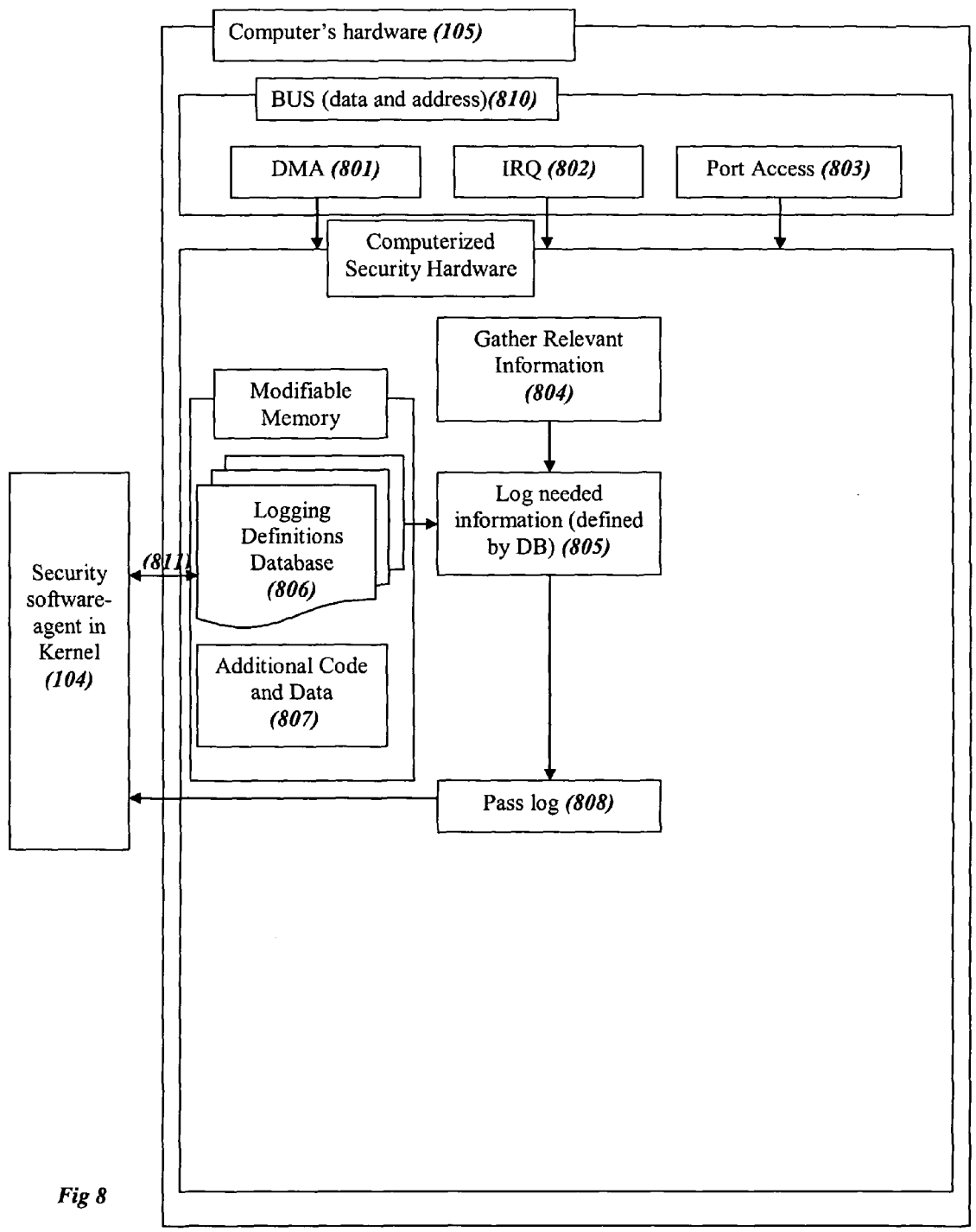
FIG. 8 shows in more detail preferable interfaces and operation of a possible variation of using additional hardware, which monitors hardware accesses on the computer's data bus and has a 2-way interface with the Security System's software.

The Security System may also include (as another possible variation) an optional hardware element (800) shown in more detail in FIG. 8, which can alert the Security System's software to any events where access has been made to the security-sensitive ports (803) and/or memory (801) without an apparent corresponding event on the system level as monitored by said Security System's software. Another possible variation is to put a similar element for example, instead or in addition, in the modem or communication card itself, and/or for example in the motherboard or in the CPU itself, and/or for example on the hard disk interface.

Further referring to FIG. 1, preferably the main rules and functions performed by the Security System include at least one or some or more (but preferably most) of the following:

1. Preferably programs are automatically segregated into their natural environments, so that by default, preferably each program (software application) is allowed to access (for example read, write, execute, create, delete, etc.) files only within its natural environment (which is mainly the directory in which it is installed, its sub-directories, and, preferably for reading only, non-strategic shared files). This way, even applications that are run within other applications, such as for example Java or Active-X within browsers, still have to conform to the security rules together with the browser itself. (Another possible variation is that the user may also ask in advance to protect and monitor only certain directories (or groups of directories), but by default all directories are monitored). If the program is attempting to be installed in the root of any drive, preferably the user interface part (103) of the Security System warns the user about it, and if he allows it, then the natural environment of such programs is limited only to the root of that drive and does not include its sub-directories, otherwise the segregation to branches would be meaningless in this cases. (In the more extreme embodiments explained in the reference to FIG. 11, another possible variation is that the program is given the illusion that it installed itself on the root of a drive, but in fact it is in a limited Virtual Environment, and thus in a lower directory). Similarly, the Security System preferably constantly monitors, intercepts, and warns the user of any attempts by programs to access the storage devices (110) through direct I/O, since that could render meaningless the segregation rules. (This can be accomplished for example by putting the Security System in ring 0—Using Intel architecture terms). This can be viewed either as a segregation of programs or of processes, however it is more preferable to implement it according to program files, since for example two or more copies in memory of Netscape will still typically have the same privileges and definitions. On the other hand, if different threads are run by some programs, for example Java or Javascript by Netscape or for example active-X by MSIE, another possible variation is that they can be treated separately as processes, or they can be identified separately anyway for example by the file from which the DLL originates, etc. But even if for example the active-x or Java are run by functions within the browser which are indistinguishable from other internal parts of the browser, according to the above definitions the scope of damage they can do is automatically limited by the limited access the browser itself has outside its normal environment, as explained above. Another way to explain it, which also shows the problematic nature of the prior-art situation, is to compare the computer to a hotel. Allowing a program to do whatever it likes to other programs or to their data files or to critical files of the operating system is as absurd as letting a guest in a hotel bother any other guests as he pleases, enter their rooms, steal their property or copy it or destroy it, destroy their rooms, etc., or for example have free access to the hotel's safe or electronic switchboard or elevator control room, or phone. The present concept is like limiting each guest by default to his room and limiting by default his access to the Hotel's strategic resources, so that only by explicit permission each guest can get additional privileges. In order to make the segregation more effective, preferably the user is encouraged to place each newly installed software in a separate directory. However, since many users download new files into some common download directory for convenience reasons, there is a possibility that a malicious software will attack (for example delete or corrupt) other files in this download directory when the user tries to install it, or for example read other downloaded files in that directory to find what their default installation directory is and for example also which software is used to open them, and then for example pretend to be related to other programs in the download directory and thus get itself installed in the directories where they were installed. In order to prevent this preferably the security system can use for example context sensitive information, such as for example the time each newly downloaded software was added, so that unreasonable or suspicious behavior can be easily detected if a downloaded program for example starts looking at files that were downloaded at different times, even though they are in the same directory, or starts for example going over the entire directory and/or tries for example to modify other executables in that directory. As explained, of course various combinations of the above and other variations can also be used.

2. By default, preferably no program is allowed without permission to access and especially to modify or replace sensitive areas or files (as defined below) or device drivers in the storage media (and preferably, to the extent possible, also in the computer's RAM (112)), which are regarded by the Security System as High security areas, such as for example critical operating-system files, registries, INI files, important DLL (Dynamic Link Libraries) files, communication-related files (such as for example Winsock, etc.), the boot sector, the FAT, autoexec or configuration files, the initialization areas of the operating system, the Windows Startup directory, the BIOS, user defined high security files or directories, system files that contain lists of URLs from which drivers can be automatically downloaded without asking the user, all the executable and data files and databases related to the Security System itself, or anything else that may prevent the Security System from continuing functioning properly or initializing properly after the next boot. Similarly, the Security System preferably constantly monitors attempts by various programs to access for example the area of the hard disk used by the operating system for the swap files and/or other cached areas on the disk, since that could also allow various security breaches, such as for example replacing critical DLLs with malicious DLLs while they are cached on the disk during virtual memory swapping. In addition to this, the system may preferably to the extent possible also protect (600) some RAM (112) areas if they are not adequately protected by the computer's operating system (101). For example, there might be a vulnerability that enables applications to access a shared memory area called "System internal object name space" and change the names of DLLs, thus replacing them with references to malicious DLLs. In addition to this, the Security System preferably makes sure (600) that it will not be thrown out of the RAM by other applications that might try to neutralize it, for example by checking all the time that it is not thrown out of the DDB (Device Descriptor Block) by other applications and putting itself all the time in the first place there, and/or for example by the methods described in FIG. 9 about self-preservation. Preferably, unless it is sufficiently done by the operating system itself, to the extent possible, the Security system also prevents programs from accessing also in memory the code or data of other programs or their drivers or DLLs, etc. (for example unless given explicit permission to do so). This can be done for example by a method that when each application is running, all the pages of other applications are marked as missing, so if the application tries to access their data or code in memory it causes a CPU exception and then the Security System handles it and disallows the access unless the missing page is really a page that belongs to that application. Since in Windows there are for example a number of API (Application Programming Interface) functions that allow programs to behave like debuggers, thus enabling them to access and/or alter the memory of other programs that are currently running, preferably the Security System asks the user to explicitly authorize programs that he wants to allow such privileges. Another possible variation is that if programs that have not been given special access rights try to access such APIs, they are automatically prevented from that, or even cannot see such APIs. Also, preferably APIs that allow file-handle copying between processes are automatically disabled, or they are allowed to be used only between programs that are running within the same Virtual Environment.
3. In addition to this, as much as possible, preferably most of the high security areas described above in clause 2 are monitored regularly for signs of suspicious changes preferably by means of a hidden fingerprint for each such file which will cease fitting the file if an unauthorized change has occurred, and preferably there are also additional hidden encrypted and regularly refreshed backups of important areas that can be used to restore them in case of damages to them.
4. Preferably any program that tries to access (such as for example send, receive, listen, connect etc.) communication channels (111), including IP address, port and protocol (for example win-sockets and network shared device drivers (300)) needs to get permission from the user (unless it has already been given this privilege). This is very important since normal firewalls only check access to the standard win-socket, and thus for example any Trojan horse that has its own built-in communication socket and/or that for example installs some driver that accesses directly the network communications card or its driver—could bypass the entire firewall. Based on this monitoring, the user is preferably warned and is asked for authorization when needed, inbound or outbound, including any attempts from programs or hackers from the network (120) to connect to the user's computer, and the Security System may also trace-route such attempts on the net (120) in order to find the source of the attack Preferably on personal computes attempts to communicate from the outside are automatically blocked and logged without bothering the user. Preferably, when the Security System checks or asks for permissions, such as when it asks the user for example if to allow a certain application to access communication channels, it shows additional relevant data apart from the application's name, such as, for example, the full path of where the executable is installed, its size, its date, and/or details such as for example CRC, memory segments, or other identifiers, in order to reduce the chance that some hostile application might for example install itself under some directory and name itself netscape.exe and thus be given inadvertently by the user access to the web. This means also that for example if an application changes after being given certain permissions, the user will be asked again about it and preferably warned explicitly about the change. Similarly, preferably, if another application with the same or similar name is already listed in the Security System's Database, the security system preferably warns the user about this, in order to further avoid confusion. If the user is for example an organization and the organization wants for example to allow the system administrator to control which applications have access to the web, then for example each time an employee working with a certain computer allows a certain application to access the web, then preferably this can be permitted only if it fits the definitions allowed by the administrator, preferably using various identification marks to make sure that it is indeed an allowed application and not some other executable with the same name. This can be accomplished in a number of possible ways: For example the administrator can define allowed applications with their identification marks and broadcast this once in a while to all the computers in the organizations, and the Security system will allow access to communication channels only to applications that comply with these definitions (preferably these definitions are password-protected and also reside in an area regarded as a high-security area). Another possible variation is that various requests for authorizations (preferably including various identification marks of the applications) are broadcast by the security system directly to the administrator without even asking the employee and preferably remain blocked until authorization can be given by him. Another possible variation is for example that new authorizations given to applications by the employee (or at least authorizations on important issues) are broadcast by the security system also to the administrator, and allowed only if he OKs them. Another possible variation is for example that, at least for certain authorizations, the user has to call the administrator, and only he can authorize them for example with a password. Another possible variation is for example that applications that are allowed to access the web and/or other communication channels reside only in one (or more) computers in the network and the other computers can access them for example only by limited access through local-area network. Various combinations of these and other solutions are also possible. Also, preferably the Security System allows the user to define general limitations on the communication channels (111) allowed to be opened and and/or for example also limitations on types of protocols allowed, which is especially useful in cases where the computer is being used as a server, since in such cases the computer will run most of the time unattended by the user, or for example if the user wants to block automatically all incoming communication attempts and just log them. Additionally, due to the nature of E-mail Macro-viruses, as added security measures, the system preferably constantly monitors the communication channels for outgoing E-mail messages and asks the user for confirmation any time that one or more e-mail messages are being sent out by any program (even authorized programs) or at least and especially when multiple E-mails are being sent out consecutively and/or at least or only when the e-mail message or messages include an attachment or attachments and/or at least when this attachment or attachments are executable files. Similar rules can be used also for example for other data leaving the computer, such as for example through instant messaging programs or chat. (However, a malicious program can for example also just send by email for example a malicious html which takes advantage for example of MSIE vulnerabilities, however in that case typically the needed executable code is also contained in the email message together with the html code, since otherwise the code would have to be taken for example from some Internet site which the html points to, and then the hackers can be easily traced, so it is unlikely to be used. Or for example the malicious program might send out the mail in a clandestine way through telnet (or for example some other connection) directly to a mail server (this can be for example the normal SMTP server to which other programs on the user's computer connect). Preferably the last case is prevented by having to get explicit permission for a program to access the Internet for example by using the telnet protocol, as explained above. Since typically the user has at most just one or two specific programs that he uses for telnet, he can certainly see that an attempt by a new program to use telnet on its own initiative is highly suspicious). Of course, like other features of this invention, these features can be used also independently of other features of this invention. Preferably, the Security System also learns by this process various characteristics of the way the user is normally sending e-mail messages, so that whenever sudden unusual characteristics are apparent, preferably a special interception and warning can be issued. For example when sending e-mail normally through a program like outlook express, the relevant MAPI functions may be called differently and/or other processes may happen differently than for example when sending e-mail from a Visual Basic Script executed by outlook express. In addition to this, since programs that are allowed to access the communication lines (and especially browsers and e-mail programs) are usually a crucial link in Internet related attacks, preferably such programs are always monitored more thoroughly by the Security System, and therefore regarding such programs preferably the user may not tell the Security System to stop asking about various behaviors. Examples of said communication channels in terms of hardware can be the modem, Ethernet card(s), or even the USB (Universal Serial Bus), which can also be used for example for ADSL connection, or any other device that exists or might exist in the future which might be used for communicating data in and out of the computer. This comprehensive covering of all possible communication channels is extremely important, since otherwise the whole security system might be rendered useless. Examples of said communication channels in terms of software can be any of the system functions that can access any of the said hardware devices that can be used for communication, including for example TAPI functions, which can use the modem for sending Faxes, since, otherwise, a malicious application might for example turn off the internal loudspeaker of the modem and dial out and send out stolen data as a Fax. This applies also for example to any access to wireless channels, such as for example Bluetooth or infra-red, since this also can be used for sending data to the computer or stealing data from it. As explained, of course various combinations of the above and other variations can also be used.

5. Preferably, the monitoring & capturing system (102) conducts constant statistical analysis of various events in the computer in order to learn about normal behavior and identify significant deviations from the normal behavior (such as for example sending out significantly more data than usual, accessing more files than usual, etc.). Preferably, especially the programs that have been authorized for use of the communication channels (111) are constantly statistically analyzed and monitored for suspicious deviations from their normal statistical patterns of behavior, so that if such a program for example suddenly starts to access significantly more files than usual or scan large areas of the disk (even if it has been allowed by the user to access areas outside its natural environment) or starts to send out unusual amounts of data, it is preferably immediately intercepted and the user warned and asked for authorization. This is important also in cases that programs start to act strange due to their being changed while already loaded in memory, for example because of some hardware failure or because they were crashed by string overflow (for example accidentally or by malicious buffer overflow takeover), etc. Preferably the security system can also support more than one user working on the same computer with separate statistical information, preferably by keeping separate user profiles. Another possible variation, preferably in addition to this, is that the security system preferably also checks at least for highly important processes in RAM memory (such as for example in Server applications or applications that have been given privileges, such as for example permission to access communication channels and/or to exceed their natural environments), preferably in short intervals, that its code has not changed in RAM memory (which can happen for example in cases of buffer overflow or in cases of hostile takeover in memory by another process). This can be done for example by checking its COFF format when it is being loaded into memory, in order to know where the code segments are and not be confused by changes in the data segments, and then preferably marking the code with a highly sensitive checksum. Another possible variation is for example making sure at least in important applications that their code is always only in hardware-protected read-only memory segments. This can be done for example by changing their COFF mapping to ensure proper alignment of code into separate pages tagged as read-only, so that any attempts to change the code and/or attempts to execute the data will cause CPU exception. Preferably this is done in combination with an improved CPU which has hardware support for automatically not allowing the CPU to execute any code which is in an area defined as data, since otherwise a malicious buffer overflow can for example use stack smashing in order to insert an executable code into the data area and a return address in the stack that points to that code, and then it does not need to change the code of the original process (This automatic separation is of course much better than for example just counting on programmers to mark each area of data as non-executable. This can be done for example also automatically by the compiler, however it is more safe to let the Security System and/or the OS do this, in addition or instead, since otherwise this separation will be done only for programs that have been compiled with compilers that support it. Another possible variation is that for example the System and/or the OS and/or the compiler can automatically mark separately areas or ranges of areas as data or code, so that the automatic tagging can be done even without the need to put data and executable code on separate pages). Although in this case the buffer overflow can also change the return address in the stack to point for example to another malicious DLL that has already been installed in the machine, this will be preferably automatically blocked or limited as being outside the natural environment of the overflowed application, so preferably all actions of the DLL will be limited to the Virtual Environment of the compromised process (unless that application has already for example unlimited access rights, which is preferably rare and limited only for example to programs such as Anti Virus or other special programs that by their nature need free access to the entire disk), and/or for example that DLL will be automatically limited to its own environment even if executed by the compromised application (however, that is less preferable). Another possible variation is that, in addition or instead, the CPU refuses for example to return from the stack to addresses that are outside the memory area of the program's code, which creates for example an enforcement that DLLs can only be activated by properly calling them from the program's code, and thus stack smashing cannot activate any code that is not part of the original program (Even this by itself can prevent code from running in the data areas since that would also be outside the area of the program's code. However, since the proper call itself might involve using a stack to transfer the parameters, preferably the CPU can differentiate if the call was made in the code itself). In fact, Microsoft has added the prevention of data execution, both by software and/or by hardware to the recent XP service pack 2 in the $2^{nd}$ half of 2004, however the problem still remains that even with this improvement, according to http://www.microsoft.com/technet/prodtechnol/winxppro/maintain/sp2mempr.mspx, typically attempts to execute code from the data area may still cause the process to terminate and/or even cause the system to fail with Bugcheck. This indicates also a deeper problem, which is that even just data crashing can be dangerous, such as for example in the above example of changing the return address, or for example if various data that may include for example information about file names or disk segments or web addresses or user permissions is crashed, etc. Therefore, in addition to the above, preferably the security is improved so that even data crashing becomes automatically impossible or at least much more difficult to do. This can be done for example by improving the compilers to perform much better automatic checks and preferably automatically add (for example preferably for every type of reading data for example from a user interface or from a file) additional code that automatically cuts off any data that exceeds the size of the input buffer, for example in a way similar to the way that Pascal compilers automatically add code that cuts the data that can be read into a string when it reaches the size of the string, except that this is preferably done for example also in C compilers and preferably for every possible type of data input an not just strings. Another possible variation is that the security system and/or the OS can for example analyze executable files that have already been compiled or for example were written is assembler and preferably identify automatically problem areas where for example buffer overflow may occur and preferably automatically add code that can prevent it and/or at least for example issue an automatic warning about such vulnerabilities, and/or for example at least the data stack is better protected by any of the above methods and/or for example by automatically keeping return addresses at a separate place from the data (and if in some cases executable code is also kept in the stack then preferably these executable codes are also preferably automatically kept in a separate place from the data).

6. Preferably the Security System monitors as much as possible all attempts of software applications to gain direct port accesses to security sensitive devices (such as for example the modem and network cards (111), hard disk controller, etc.), or to bypass for example the winsocket drivers, since such access could bypass the operating system. Windows NT for example allows only drivers that are installed in ring 0 to access such ports directly, so ordinary applications are automatically prevented from doing this, but some other versions of windows do not enforce this limitation. Therefore, preferably the Security System tries to enforce this as much as possible even on systems were it is not enforced. As explained below, preferably the Security System inserts itself in ring 0 and pushes the operating system and the installed drivers for example to ring 1, and thus the security system has the control on direct port accesses, including for example DMA (Direct Memory Access) and PIC (Programmable Interrupt Counter). For this the Security System preferably controls for example also access to the TSS (Task Segment Selector) and preferably prevents other processes from accessing it, since accessing the TSS enables access to the ports and could also enable a malicious program for example to take control of the computer by enabling hardware multitasking, thus being able for example to neutralize any other software, including the OS itself.

7. During its own installation, the Security System preferably performs various checks if various crucial system files are suspicious of being infected already, and in that case might for example recommend to the user to reinstall the operating system before trying to install again the security software.

8. In order to solve the security problems created by the existence of writeable shared directories such as for example the windows temp area, the Security System preferably implements also a new concept: Virtual Shared Directories. This way, each time an executable tries to access such a shared directory, it will be preferably given the illusion that it has accessed it, but in reality, each such executable will be preferably redirected to a separate private sub-directory which only it can access. Similarly, when executables are accessing for example shared keys in the registry, the Security System preferably implements also a Virtual Shared-Keys system such as for example registered components, etc., so that again, preferably the executables are given the illusion that they have accessed the shared keys, but preferably they are in practice being redirected each to its individual private file of relevant registry keys. Preferably this is implemented also for example when a program needs to install certain files, such as for example DLLs in system directories. Preferably the virtual shared directory is implemented for example by giving the program a logical view of the shared directory or for example only some of the files in it, so that if the program is allowed to see them it preferably sees the original copy (to reduce unnecessary duplication unless needed), but if it changes any of those files, the changed files will in reality be copied into files in the program's individual private area and changed only there (This can be regarded as an extended implementation of the "Copy-on-write" principle). This, in combination with the other rules/functions, and especially rule no. 1 (about the automatic segregation), can also be described in other words as a system of multiple automatic sandboxes, or a system in which each program is limited to its own virtual computer or virtual environment. Another possible variation is to use similar virtual sharing also on other shared resources of the computer. As explained, of course various combinations of the above and other variations can also be used.

9. To the extent possible, the Security System preferably also tries to push the operating system or at least parts of it (such as for example the installed physical device drivers and/or the device drivers of the operating system's inner core and/or any other elements that can allow to gain a similar level of control or protection and/or additional parts), to the extent possible, from processor ring 0 (privileged) preferably to ring 1 (less privileged), preferably with the aid of an additional component that converts all the needed functions to run in ring 1 instead of ring 0. However it is more preferable to push also the operating system itself or as many parts of it as possible to a higher numbered ring since this allows closing also backdoors or vulnerabilities in the operating system itself. Preferably, the security system runs below the operating system and intercepts the operating system the moment it is being loaded into memory and transfers it preferably to ring 1. Any attempt by the operating system to access ring 0 will now cause a CPU exception, and, in order to increase efficiency, one possible variation is that the security system preferably rewrites on the fly each such command in the operating system code which is running in the computer's RAM to access instead the current ring in which it is in (such as for example ring 1), so that the next time that line of code is accessed in memory, the exception will not occur anymore (until the next boot). Another possible variation is for example to change at least some of the system files on the disk. This is an additional way to block any hidden doors that might exist in the operating system. And of course it allows easier control over the access to system resources. Although these rings are concepts in Intel processors, similar rings or concepts might be used also in other processors. Another possible variation is that the operating system itself moves for example all the installed physical device drivers for example to ring 1, so that any attempt to access directly any physical devices, such as for example the communications card or the hard disk card, will create a CPU exception and then the operating system decides what to allow or not. But that means adding various features of the Security System to the operating system itself or for example making the security system an integral part the operating system. Another possible variation is that the physical device drivers and/or the operating system or parts of it are for example still in ring 0 but there is a special more privileged area (or areas) within ring 0 or for example below ring 0 (for example ring—1) which can preferably catch all the exceptions caused by the device drivers in ring 0 and/or by the operating system and is preferably immune to attempts by other drivers or by the operating system to neutralize it or take its place. This can be accomplished for example by adding such a special privileged sub-area within ring 0 and/or below ring 0 by a change in the CPU itself. This has the advantage that it can be easily accomplished without having to deal with the complexity of pushing the operation system to a higher ring. The feature of adding additional control below the operating system by defining a special sub-area within ring 0 or an additional ring below ring 0, can be used also independently of other features of this invention, and various elements may be added to this control. Another possible variation is that preferably in addition, in order to prevent device drivers from accessing devices other then those that they are intended to access, preferably each device driver must have a definite type indicator (such as for example disk driver, screen driver, Network card driver, Mouse driver, etc.), and when a new device driver is installed preferably the user is asked specifically if he allows the program to install such a driver. And when a driver runs and/or during its installation preferably the security system and/or the operating system and/or for example a hardware element (for example in the CPU itself) preferably checks that is does not access other physical devices that don't belong to the type it is allowed to access, so that for example a screen driver cannot access directly hardware ports of the disk or of the network card or of the input devices, etc. However, if the drivers are for example in ring 1 and the security system in ring 0, there is no need for special hardware support, since any attempt of the drivers to access direct hardware ports will cause an exception and then the security system can check if the driver should be allowed to access the device it is trying to access. However, if a device driver is limited to a certain type of devices, preferably it is also prevented from accessing directly other drivers that can access other types of devices, otherwise this can bypass the limitations. Another possible variation is that at least some device drivers are associated only with the programs that installed them or with their Virtual Environments, so that for example if a malicious program installs a new keyboard driver that changes for example "yes" to "no" and vice versa or for example steals keystrokes into a log file for later sending it to the Internet, the only program that can use this driver and thus be affected by it is the program that installed it (or for example other programs that are within its own Virtual Environment). So if there is for example a device driver for an input device, such as for example the mouse or the keyboard, (and/or for example an output device, such as for example the printer or the screen) which is associated only with a certain program, preferably when it is swapped out during multi-tasking, preferably if there are any hardware buffers associated with it, they are preferably also copied and cleared, so that no trace of it can affect other programs. Another possible variation is that the security system or at least part or parts of it (for example any of the parts that are below ring 0) become active even if the computer is booted for example from a floppy drive or CD or network drive or any other source that is not the normal boot area. In other words, the security system or part of it is automatically activated for example by the BIOS or by the processor itself before the normal boot sequence begins. Preferably it is by the processor itself (For example if at least a small part of security system or a special pointer to it is stored for example in a special ROM area in the CPU itself), so that even changing the BIOS's EPROM will not prevent it from becoming active. Another possible variation is that if the security system discovers for example that the BIOS has been compromised or corrupted (for example if it was changed without authorization according to a digital signature or starts to behave suspiciously), preferably the security system can issue a warning and/or restore it from various preferably hidden backups. Another possible variation is that when changes need to be made in the security system itself—for example updates or bug fixes—preferably the user is prompted very explicitly to confirm it and/or for example some physical key needs to be physically attached to the computer or to any of its peripheral devices (such as for example the keyboard or the mouse) during the update in order to allow this to happen. Another possible variation is to require for example such a key for making changes to the BIOS. Similarly, another possible variation is that the security system is also hardware-protected, so that it cannot be removed by any software means. This can be accomplished for example if it or at least a part of it is stored on a ROM device, and for example the CPU itself will issue a warning and/or restore it from various preferably hidden and preferably protected backups and/or stop executing any other programs until the Security system is restored. These features of safety even during foreign boots and/or if the security system was compromised by any other means, can be used also independently of any other features of this invention. Of course, various combinations of the above and other variations are also possible. Another possible variation is to enforce the automatic file segregation among programs by encryption, so that each program for example can only access files or libraries for which it has the access code. As explained, of course various combinations of the above and other variations can also be used.

As explained in the beginning of the clarification section, any feature or element of the above features or elements or at least some of them, like other features or elements described in this application, can be used also independently of the other features or elements. Among other things, this system and method are important for example for the prevention of theft of highly sensitive codes, such as for example private encryption keys or credit card details. This is important because in the USA a recent legislation regards digital signatures as no less obligating than handwritten signatures, and in other countries there are similar legislations in process. One of the biggest service suppliers in this area bragged that it could take almost infinite time to break the private keys in these digital signatures, but ignored the simple fact that there is no need to break the keys since it is much easier to steal them, for example by a Trojan horse arriving by e-mail or through a web page by exploiting various loopholes in browsers or e-mail programs. Since such a signature can be compelling in any kind of contract, including wills and huge real estate deals especially in places where it comes with a non-repudiation policy, it is clear that the damage from stolen keys can be enormous. This is especially dangerous since many times such private keys are generated and stored for example by the browsers. By enforcing the rules, such as the automatic segregation rules and requesting authorization from the user about any access to any communication channels, such theft can be thoroughly avoided. However, in the cases where the keys are generated or stored by the browsers, preferably additional rules are used in order to identify the directories where these keys are held, otherwise accessing the keys by the browser would be within the browser's default authorization. Also, preferably, in this case the Security System also learns various characteristics of the way the user is normally accessing the keys, so that when sudden unusual characteristics are apparent, preferably a special interception and warning can be issued. Even if hardware cards, such as for example smart cards, are used for storing the encryption keys, these keys might still be stolen by Trojans for example by overwriting parts of the programs that access these cards or by monitoring the data in memory while it is being generated by these programs. Another possible variation is that, preferably in addition, preferably the user can keep various different keys, preferably each limited to one or more specific purposes (for example one only good for communications with the USPTO, one only good for a certain type of documents, one only good for certain types of authorizations, one good only for authorizing expenses up to $1000, etc), so that even if keys are stolen then they preferably cannot be used without knowing the limitations of each key and cannot do damage beyond their limited abilities. The list or lists of limitations are preferably kept in an isolated separate place with encryption, or for example are kept only at a separate authority, for example the authority that issued each key.

In cellular phones, for example, eventhough they usually don't have yet sophisticated or sensitive operating systems and file systems compared to Windows, for example, and the operating system is usually EPROMM based, still at least some of the principles of the present system and method can be applied, such as for example:

1. The self-defense principles, such as requiring authorization to modify the BIOS's EPROMM and such as outlined for example in FIG. 9, and protecting the system-critical areas, are easier to implement, since the entire operating system and the security system may be on EPROMM or similar non-easily modifiable memory. So, for example, any attempt to modify any EPROMM data needs explicit permission from the user.
2. The RAM memory used for processing data operations is preferably monitored against hostile activities.
3. Since cellular phones and other mobile devices will be used more and more for business transactions, such as buying from e-commerce sites, transferring funds, stock market instructions, etc., the security of sensitive codes such as for example credit card data and especially private encryption keys is extremely important. So, for example, any attempt to access the private encryption Keys in any way preferably needs explicit permission from the user. Preferably in these cases the user is also asked for a password, which helps for example in cases where the phone is stolen.
4. Any attempt to automatically dial-out or automatically answer incoming calls preferably needs explicit permission from the user, especially if multiple automatic dials are attempted. This prevents any viruses from causing the phone to automatically send messages to various places, or from becoming for example a spying device, recording what is going on in the room and sending it out without the user's knowledge.
5. In case of constant open Internet connection, expected for example in the $3^{rd}$ generation cellular phones, like in the PC example, preferably no program can access the web without prior user permission and no connection initiated from the outside can come-in without user permission.
6. Any unauthorized access to additional communication channels, such as for example Bluetooth devices also is preferably-blocked or has to be authorized by the user.
7. As cellular or mobile or other phones become more sophisticated and computerized or for example integrated with palm devices, they may contain more and more features typical of ordinary computers and operating systems, and then more features of the present system and method may be needed and implemented.

More technical details are described in the following figures.

Figure 1B:
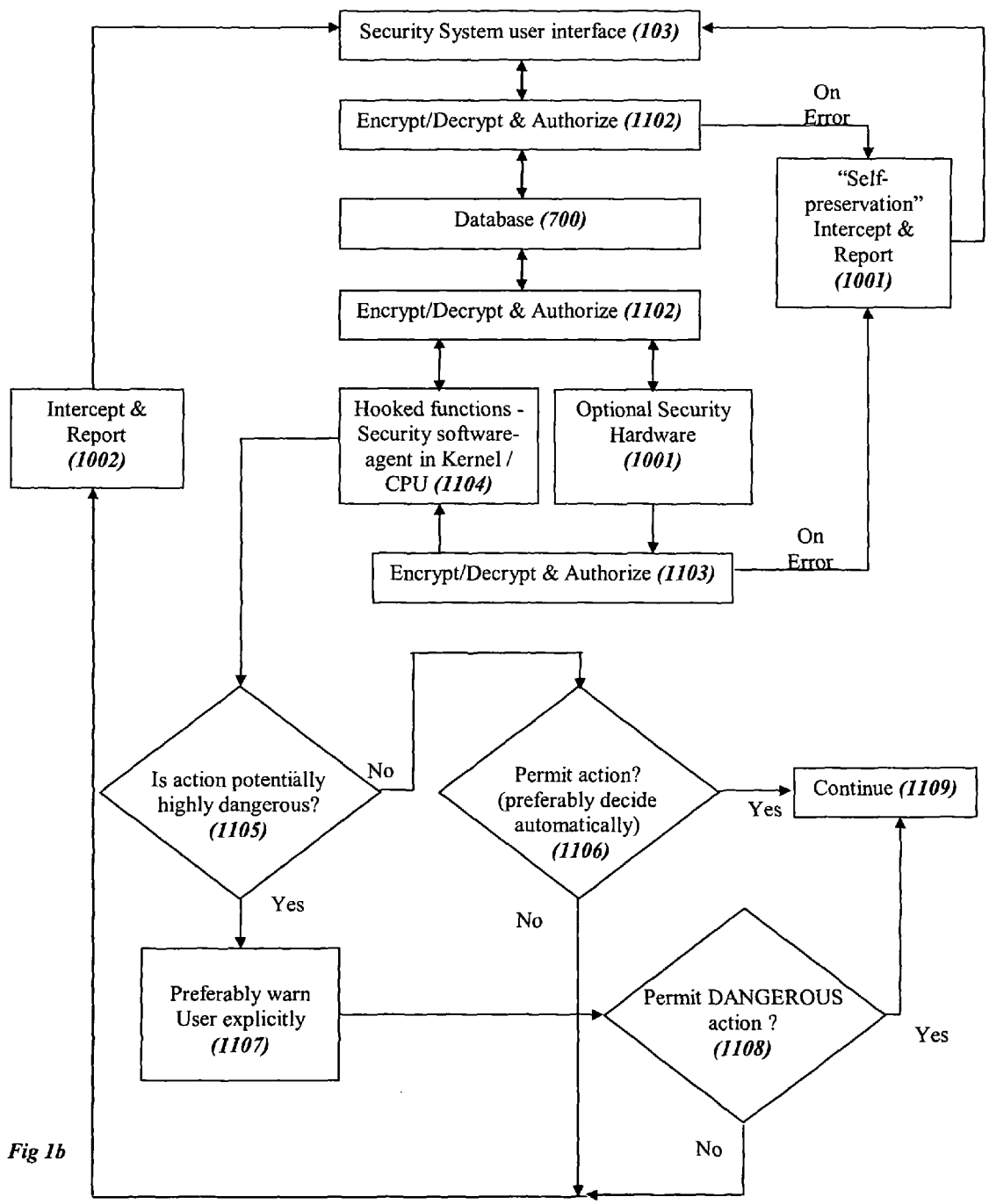
FIG. 1b shows in more detail a preferable way of interaction between Security System parts with an emphasis on the user interface and a preferred process of permission granting.

FIG. 1*b* shows in more detail a preferred interaction between Security System parts with an emphasis on the user interface (preferably graphic user interface) and a preferred process of permission granting. As soon as a program (executable) tries to perform what is considered by the Security System as suspect or potentially dangerous activity (such as for example exceeding the natural environment of the program or trying to access the communication channels), the monitoring and intercepting system (102) immediately stops the program (1002) and may for example ask the user for authorization or block it automatically, and if the user is absent, for example in case of protecting a server, suspect activities may be for example either blocked until the user comes back and/or logged (770), and such decisions are made for example either according to the various sets of security rules (740) and the nature of the suspect or dangerous activity, or by user definition. Preferably, for non-highly dangerous activities (1106), the Security System gives the user options such as for example to abort the offending program immediately, allow only this time, disallow but let the program go on, allow always from now on or until a certain event, stop asking completely about similar breaches for this program, or stop asking completely about similar breaches for all programs in this directory and its sub-directories. Another possible variation, described later below, is that at least for such activities the security system relies mainly on whether the user or the program initiated the activity, and thus the security system can for example ask the user less questions or no questions if the user initiated the activity, and for example block it or limit it automatically if it was initiated by the program. Of course various combinations of these variations can also be used. If the suspect activity is related to files, the Security Systems preferably asks also if the permission is given only for reading of data or also for modifying data, etc. If the suspect activity is related to communication channels, the system preferably may also for example allow the user to specify which channels to allow the application to use and what related activities to allow. The examples (in all of the figures) are intended to be illustrative and not limiting. Preferably, in order to avoid careless responses by the user, the user is always asked for authorization in such ways that responding without paying attention will always default to the least dangerous options. Preferably, for highly dangerous activities (1108), such as for example formatting a drive, mass deletion of files, changing hard disk partition information, changing boot area information, installing drivers in levels close to the kernel of the operating system, accessing the high-security areas, or modifying executables that reside outside the natural environment of the offending executable programs (such as for example exe and corn files, batch files, DLLs, MS-DOC, MS-XLS files, or any other file that might contain executable commands), renaming them, renaming directories, or changing the linking of file types with applications that will be run when clicking on them, etc.—the user is warned more explicitly (preferably also with an explanation about the possible implications and causes) and/or for example asked to repeat the authorization twice. Preferably some of these activities are considered more dangerous than others, so there is a hierarchy of potentially dangerous behaviors. Preferably, this is applied in all cases—even for programs that were allowed by the user to exceed their natural environment. Preferably, when the user is asked for authorization, the security system also makes sure that no other programs can enter false answers as if they were entered by the user through the keyboard or the mouse or any other input device, for example by preventing other programs (except the allowed relevant input device drivers) from adding data for example to the buffer of typed keys in memory and the buffer of mouse events, or for example by using the hooking of all keyboard access and all mouse events to make sure that whatever is read for example from the keyboard or mouse is identical to what is in their event buffers or using only the commands that come directly through these hooked functions. Another possible variation of this is that the Security System freezes all other processes while it is waiting for the user's reply, for example at least for highly dangerous activities. Another possible variation of this is that the Security System plants its own keyboard and mouse drivers instead of those normally in use, however this could be problematic when a non-standard keyboard or mouse is used. Another possible variation of this is to use for example a smarter keyboard and/or mouse which uses also encryption preferably with a date & time stamp, like in the communication with the administrator's computer, as explained below. In addition to this, preferably the Security System also controls access to events and to objects (such as for example the edit box) and to the memory of programs such as for example shell32.dll, user32.dll & gdi32.dll (which are related to the Windows user interface, for example when using the standard open file dialogue box), so that programs don't create false events (such as for example pressing the OK button even though it hasn't really been pressed) or for example altering by direct memory access the content of the input line that contains the file name. Preferably this is done for example by replacing at least part of the Operating System's dialogue boxes and preferably intercepting and/or replacing also other components that can request input from the user, so that the Security System has more control on what is happening in them. Similarly preferably the security system also separates between messages and objects at the process level and controls access to messages and preferably scans the messages before they can enter the Operating System's message system in order to catch for example falsifications and/or unreasonable or suspect messages or potentially dangerous messages. Preferably, when programs execute other programs, the executed programs also have the same limitations as the programs that executed them (for example especially being limited to the same Virtual Environment of the executing program), and preferably programs are allowed to send OS messages only to programs which are running within their own Virtual Environments. Preferably the Security system replaces at least some of the OS functions that deal with the OS message system, and preferably it attaches to each message an identification that shows if the OS or another application is the source of the message, and if it is an application, preferably also the identification of the application. Preferably, the Security System allows certain messages to be initiated only by the OS, such as for example timer messages, messages that indicate various hardware events, etc. This way, for example, only the Operating System can send to a program a message that indicates what was read from the keyboard or the mouse. Like other features of this invention, these features can be used also independently of any other features of this invention, as explained in the beginning of the clarifications and definitions section. Preferably these or similar methods can be applied also for example in systems that allow voice commands. Another possible variation of this is to ask the user also for password for at least some of these authorizations, such as for example for highly dangerous activities, which is good also in order to decrease the chance that the authorization will be given by someone else for example while the user is temporarily away. Of course, various combinations of these methods can also be used. Preferably, like in the examples given in function 4 in the reference to FIG. 1, the Security System also preferably identifies if the user or an application initiated a potential security-risk command, such as for example accessing a file outside the natural environment of the program for a program that still does not have that privilege, and so can for example allow more flexibility and less limitations (or even no limitations) if the command was initiated directly by the user than if it was initiated by the application. This can save the need to ask the user for confirmation in cases where he himself directly initiated the command, for example when it is not a highly dangerous activity, so if the program initiated the activity, such as for example trying to exceed its allowed environment then the security system can for example block it automatically. If it is a potentially dangerous activity, such as for example accessing high security areas (for example as explained by the examples above), such as for example accessing an important system data file or executable, preferably the user is also asked to verify it to the Security System even if he already supposedly allowed it to the perpetrating program for example through a dialogue box, or for example the action is simply automatically not allowed and for example the attempt is preferably logged. (Another possible variation is that the virtual shared areas principle is applied in this case, so that for example even if the user allowed it to the program, the program can access in fact only a copy of that file that is copied into its own virtual environment. However, this could still be dangerous, since even the copy of such a system file might for example contain dangerous information, such as for example the user's address book, passwords, directory structure, user privileges, etc. or might have access to a lower driver which has much more rights. Another possible variation in this case is to limit also the driver if accessed later through the copy of the system executable that is in the virtual limited environment of the program, but that might be problematic, especially if that lower driver needs for example access to other highly dangerous areas for its normal operation). When the user allows for example Netscape to access files outside its natural environment, preferably this gives Netscape access right to the selected file only during that session, and preferably the Security system does not assume that the user wants Netscape to be able to see the directory where that file resided. Preferably it is also not allowed to access even that same file again after closing it, without the user's permission. Preferably only by explicit permission to the security system or for example explicit change in the Security System's control table, can the user give a program for example higher-order rights, such as for example accessing a full directory outside its normal environment, or for example the whole computer, which is needed for example for programs that need it such as for example Defrag, or virus scan software, or any other software that legitimately needs to much more free access to the computer, including for example if the user wants to freely run his own compiled programs. But since programs that are allowed to access the internet, and especially highly strategic programs such as for example Netscape and MSIE, including all of their plug-ins or "helpers", are preferably watched more carefully, as explained above in feature 5 of the reference to FIG. 1, preferably the user is also explicitly warned by the Security System against giving them access rights outside their natural environments. Perhaps the user won't need to give such rights for example to MSIE or Netscape, since it is not needed for their function, but if the user for example wants to write some scripts that really do something with his files and run them for example from Word or Outlook Express or any other Office programs, he himself becomes crippled if he cannot allow the script to actually run with access to where it has to go. But if he gives for example Word those access rights, he might forget to remove them later and then other Scripts can also run with the same rights. This is as additional reason why the additional safeguards are preferably also used. However, in this particular case another possible variation is that the user can give the rights specifically only to the desired script (by allowing it to the Security System), without having to give these rights for example to Word or Outlook Express. For example even if Netscape becomes later for example compromised by buffer overflow attack and even if for some reason the security system takes some time to discover this, the compromised Netscape will still have very little access rights outside its natural environment. And even if for some reason the user has given for example Netscape or MSIE access rights outside its normal environment (for example on purpose or inadvertently or because he was fooled into it by a malicious process for example during the buffer overflow), according the above specifications preferably the additional safeguard of identifying highly dangerous activities and/or sudden unusual behaviors will spring into action if the malicious code that used for example buffer overflow to enter tries to do anything suspicious or highly dangerous. This will not unduly harass the user, since by definition unusual or highly dangerous activities are not supposed to happen often, and if they do happen, there is a good chance that the user will be happy that he was asked about it. Also, Preferably the user can choose for example if he wants more information and authorization requests from the Security system for example for highly dangerous activities, or if he wants for example most or all highly dangerous activities to be blocked automatically and preferably also logged. Again, in order to make this reliable, the Security System preferably prevents applications from creating the false impression as if the user for example typed something on the keyboard and thus initiated the command, preferably by use of any of the ways described above. However, the mere fact that the user for example typed something on the keyboard or clicked on the mouse, and the program did something, does not prove that indeed the user meant for that something to happen. For example, a malicious program might send an email every time the user clicks on some element in it, but the element says something totally different, so the user is actually being deceived. So preferably the Security System assumes that the user himself initiated a command only if he typed it directly at the operating system level or for example in a dialogue box. Similarly, if for example the Security System relies on the dialogue box of a malicious program and assumes that the user indeed authorized for example accessing a file outside the natural environment and thus does not confirm it again with the user, the user might be deceived by the program to think that he is being asked something totally different. For example the program during installation might use a large list of directories within a small scrolling window and ask the user if it is OK to install in a list of default installation directories, but hidden below is also for example the directory "C:My Documents". Or the program might use for example confusing buttons or graphics, where "yes" is really "no" and vice versa, etc. In order to prevent this, preferably the Security System disables for example graphic display of questions in the dialog box and/or imposes other limitations for programs that use them, and/or for example asks the user in such a case for additional confirmation. In order to prevent for example misleading textual questions preferably the Security system uses also at least partial semantic analysis of what the user is really being asked, for example by analyzing sentence structures or at least significant word combinations and/or for example using various rules and/or for example a statistical database of commonly used questions, etc. For example in suspicious cases or unfamiliar patterns the security system preferably intervenes and asks the user for confirmation, either each time this happens, or for example after a few positive confirmations the security system learns that this kind of questions is apparently OK. Another possible variation is that the Security system for example guards at least the top line title of the dialogue box, so the when it is an "open file" dialogue box, it will always say so clearly, and if it is a "save file" dialog box it will always say so clearly. This way, even if the user was given a misleading question by a malicious program, he can still know clearly if he is being asked to chose a file for only Read access, or if the file chosen is about to be written or changed. Another possible variation is that, preferably in addition to this, the security system itself keeps track of which files where opened only for reading, and thus prevents the program from later writing into those files. Another possible variation, which is especially applicable if the security system is for example an integral part of the operating system itself, is that a new protocol is introduced for dialogue boxes, in which for example only the security system runs completely the dialogue box and the programs have to indicate preferably in a more structured format, what they want exactly. However, in any case, since a user might mistakenly authorize dangerous things even if asked correctly, just because for example he is asked many consecutive questions in a similar format and does not pay attention, preferably there are always multiple safeguards that can catch the suspicious or malicious activities also later, as explained above. Therefore for example if the user made a mistake or was deceived into allowing a malicious program to access for example Word.exe and the program tries for example to modify the file or insert malicious code into it, the user is preferably explicitly warned about it by the security system even though he supposedly just authorized it to the program that is attempting to modify Word.exe, because it is considered a potentially highly dangerous activity, as explained above. Preferably the user has to explicitly authorize for example compilers to modify executables without warnings. In addition, preferably highly strategic executables, such as for example Word.exe (and preferably also its related files and/or directories), Internet browsers and other programs that were allowed to access the communication channels (and preferably also their related files and/or directories), compliers, and/or for example any ".doc" file or any directories that contain ".doc" files and/or for example source code files and/or directories that contain them (and especially for example any directories with the standard name of "my docs"), and/or for example directories in which the ".doc" files and/or the source code files were created by the user, are preferably considered automatically by the security system as even more important than ordinary executables or files or directories, so any attempts to access them by other programs that are not normally associated with such files or directories are preferably reported to the user even more explicitly. (Otherwise, for example the user might be inadvertently deceived into allowing a program to "install itself" into a directory containing ".doc " files, and then, even if it is implemented by virtual sharing of the directory, all the doc files might be exposed to the program and can later be stolen. Or the user might for example be inadvertently deceived into allowing a program to "install itself" in the directory that an email program, such as for example "Pegasus", uses for sending pending emails). However, in order to avoid further unnecessary questions preferably the user is able to explicitly associate new programs with such files or directories or tell the Security System to stop asking such questions about them. The security system can identify such strategic executables and/or directories and/or files for example by using predefined rules, and/or by automatically marking programs as highly strategic according to the number and/or types of authorizations they have (such as or example accessing the Internet or accessing multiple directories outside their natural environments), and/or by the fact that the user is using them interactively considerably more than other programs or files or directories, etc. Preferably the user can also explicitly mark for example certain directories and/or for example certain file name extensions as highly protected. So for example in case such a highly strategic executable such as for example Word.exe or Netscape.exe has been changed (for example because the user authorized it to some attacking program by mistake even after being prompted by the security system itself or for example because some buffer overflow for example in a running thread of Netscape allowed hostile code in memory to change also the file Netscape.exe on the disk), the user is preferably warned about it again, especially for example if the changed executable starts behaving differently from normal previous behavior statistics. Another possible variation is that if a process changes (for example a program on the disk or the executable code in memory), then it is automatically transferred to another Virtual Environment. However, preferably the security system will intercept the attempt of the running thread of Netscape to modify the disk file Netscape.exe as a suspicious behavior, and ask the user for authorization or for example block it automatically. This is very important, since if for example "Word.exe" has been inserted with malicious code, it can either for example start deleting directories (which will preferably be intercepted immediately as again a highly dangerous or suspect activity), or for example it might start secretly sabotaging only the current file that is being edited when the user saves it on exit (or for example sending it out to the Internet), in which case it could take the user much more time to find out what is going on until huge damage has already been caused. Since highly dangerous activities by definition are supposed to occur only rarely, warning the user explicitly is not going to bother the user, since in most cases the question will be justified. For example the only times Word.exe can be modified are for example when the user installs an update to word. Since the user might do this for example only once in a year or two, so he will almost never be bothered about it by the security system, and if he is bothered about it more often, it means that probably indeed some hostile software is trying to compromise Word.exe, in which case the warning is quite justified and the user will be happy that it was intercepted. Preferably the user is warned even more explicitly if a change to an executable is attempted under suspicious circumstances, such as for example trying to modify an executable without changing the date of the file, and/or for example a program in memory trying to change its own executable file on the disk, etc. Another possible variation is that highly strategic programs such as for example Word.exe or MSIE (Microsoft Internet Explorer) and preferably any Operating system files, simply cannot be changed or cannot run EVEN if the user authorizes the change directly to the Security System, unless the update or patch carries a for example digital certificate that proves that it is indeed an authorized and unchanged official patch by the vendor who made the original program, such as for example Microsoft in this case. Preferably, additional definitions of highly dangerous activities may be easily supplied as an update. However, in order to avoid issuing multiple warnings for example while a program is installing itself, preferably the Security System can handle it smartly as a continuous action within the same context. Also, when a new program installs itself, preferably the security system records which files are created by it, in order to be able to identify more easily its associated files even when they are in other areas. Preferably the Security System also analyses during the installation the imported functions in shared DLLs of the program in order to try to anticipate the behavior of the program and its needs. So preferably the Security System is installed as soon as possible after the operating system is installed, before other applications. (However, as explained above, the Security System can work also for applications installed before it). Also, in order to make this more efficient in organizations, preferably one computer can be used for example for learning all of the segregation rules and various environment parameters for each program and this knowledge can be transferred to all the other computers in the organization, regardless of the order in which the applications are installed in the other computers. Like the examples given in function number 4 in the reference to FIG. 1, If the user is for example an organization and the organization wants for example to allow the system administrator to control some or all of the important authorizations, or all of the authorizations, or for example all the potentially highly dangerous activities, then preferably various or all requests for authorization can be for example referred by the Security system directly to the system administrator instead of or in addition to asking the employee that works with the computer, or for example automatically blocked unless they fit with pre-defined permissions by the administrator (that can preferably be easily updated by him whenever needed), by methods like those described in the relevant examples given in function 4. Also, preferably various information such as for example parameters or suspect behaviors learned on one or more computers can be transferred to other computers, preferably only after authorization by the administrator. Preferably all communications with this authority (such as for example the administrator's computer) are secure and encrypted and preferably include also an exact time and date stamp, in order to prevent malicious programs for example from trying to send false authorizations or reuse old authentic authorizations for generating false authorizations. Also, preferably this communication uses special protocols of the security system instead of the normal network device drivers and protocols of the operating system. Preferably, this can enable also in practice general policy enforcement, so that for example the organization can decide and enforce very easily for example that only a certain set of programs may be run on all or on certain computers, or only certain actions are allowed on all or on certain computers, etc. The various options or variations can be regarded as various possible embodiments. However, some of them can be made available for example as separate products, or for example as various options within the same product. Preferably on each computer in an organization the level of control given to the employee versus the control for example by the system administrator can preferably be set independently for each computer in the organization. Of course, various combinations of the above and other variations can also be used.

Figure 13:
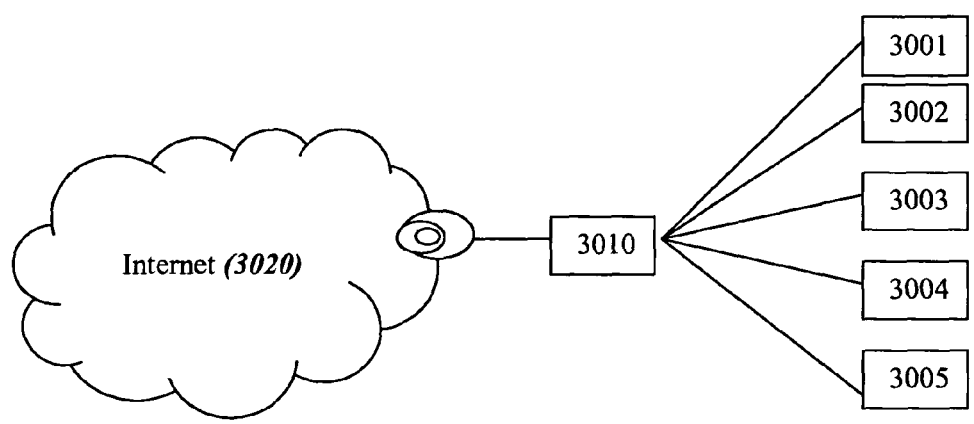
FIG. 13 is a visual illustration of a preferable configuration of connecting computers in an organization to Internet for example through the system administrator's computer.

A preferable way of viewing and/or modifying the database of authorizations is for example in the form of a table which lists the names and preferably various identification marks of applications allowed to access communication channels (and preferably possibly also a list of which channels), or to exceed their natural environments, or to have any other privileges which normal applications do not have by default, and lists which such privileges they have been given. Some activities might remain unallowed to any applications, such as for example trapping the keyboard device in order to catch keystrokes. Preferably this table includes also various statistical data about the behavior of each program, as explained before. In an organization where most control is in the hands of the system administrator, preferably the security system installed on each computer still runs a similar table and maintains a similar database, however the system can limit what the employee can change without the administrator's authorization. In such an organization, preferably on the administrator's computer this table contains also additional information and controls, such as for example the list of computers connected to the system within the organization, preferably with a unique identifier to each computer, and preferably with additional statistical information on the behavior of each computer in the list, so that preferably the system can automatically alert the administrator for example whenever a computer in the system starts to deviate significantly from its normal behavior, such as for example unusual disk activity or unusual communications activity. Such data is preferably also logged. Preferably the communication between the administrator's computer and the employees' computers is encrypted and secure. Preferably, in addition to this, the Security System on the administrator's computer constantly sends short communications at short intervals to the other computers in the system in order to be able to notice quickly for example if the Security System on any computer has been damaged or disabled. Preferably, this short communication can contain for example special codes with different keys for each computer, so that only an active Security System can respond to it properly, and so that a different response will come from a working computer where the Security System has been disabled or is not working properly (including for example if the computer was booted from a diskette instead of the hard disk), and no response from a computer that is turned off for example. U.S. application 20030055962 by Gregor Freund, filed Aug. 30, 2001 (3 months after the above feature was already included in our PCT/IL01/00487, for which the present application is a CIP) and published Mar. 20, 2003, describes similarly such querying by a gateway computer to check if the individual computers have a properly working security system, and uses this information to block computers that have not responded properly from access to the Internet through the gateway. However, intercepting or blocking communication attempts in cases of unauthorized or suspect activities is clearly one of the options available for action—as mentioned already in many other places in our PCT, including interception at the gateway. Of course other actions are also possible, such as for example checking preferably immediately what is going on in the computers that have not responded properly (for example by sending someone immediately to this computer or computers and/or for example sending some signal that can temporarily deactivate the system on the computer, which is done preferably by a secret driver that is preferably installed in the OS and can respond to the special deactivation code), since as explained above in clause 4 of the reference to FIG. 1, a compromised computer might also for example steal data for example through the modem or the fax or wireless channels and thus might bypass the gateway, or for example might be operated by an employee or an infiltrator who is trying to steal data physically, for example though a CD-R drive. Another possible variation is that preferably, in addition to this, if the computers in the organization are configured to access the web for example only through one (or more) central gateway computer (which might be the administrator's computer, or a separate computer), as shown in FIG. 13 (so that for example each normal computer in the system does not have an independent modem and only has for example a network card), this might be used as an additional control for catching backdoors that might exist for example even in the operating system itself: In this case, preferably all communications are routed also through the administrator's computer, and the Security System on each computer preferably reports to the Security System on the administrator's computer all the time or at preferably short intervals for example how much data it has allowed to be sent out from the computer's communication channels, so that the Security System on the administrator's computer can preferably notice and intercept immediately or after a short interval communication attempts from computers where the amount of actual communication does not fit the amount reported by the Security System of that computer. In order to find how much data has been actually sent by each computer, the Security System on the administrator's computer can for example check the packet headers by itself or use for this for example the services of the network firewall on the gateway computer if such a firewall is being used, or use some other routing information to know from which computers the data is coming (such other routing information, for example by letting each communication card add its own unique stamp to the data after it leaves the computer, or by other hardware features of each line, is preferable since the source addresses in packet headers can be easily falsified for example by hostile Trojan applications that send out stolen data. If the communication cards adds its unique stamp, preferably it also checks and removes any such stamps that come from the computer in order to avoid falsification, or for example the gateway or the Security System on the administrator's computer can discover such falsification because it will cause redundant stamps). This feature is very important and can be used also independently of other features to find cases where the actual amount of data sent-out does not fit the amount reported, even for example the amount reported by the dialer of the operating system. (Of course this can also catch for example also a hostile network card or modem card that might for example through hostile firmware steal data directly from the disk controller and send it out, except that in this case the unique stamp provided by such a card cannot be relied upon, and that is why preferably also other hardware features are used to identify uniquely each line). Another possible variation is that the security system of each computer preferably reports to the Security System on the administrator's computer (or for example on the gateway) in addition to this also additional data identifying the packets that are being sent out, such as for example special CRCs or various statistical characteristics, in order to prevent for example a case where a hidden backdoor (or Trojan that managed to slip through the Security System) blocks exactly the same amount of legitimate outgoing data while sending the same amount of stolen data so that the total amount of data sent out does not change. If a hostile Trojan application will for example falsify the source address of each packet (for example in a version where no additional hard routing information is available), then the central Security System will either see an illegal source or some other source computer will thus be attributed the additional data, and with the above additional feature the statistics or CRC can also help to pinpoint more easily the computer which has been taken over. Another possible variation is that, instead of or in addition to the above, the Security System of each computer preferably also encrypts the outgoing data packets (or at least their statistics or CRC data or other identifying data or fingerprints or a redundant copy of such data) with a unique identifier for each computer and a special signature (preferably also with a time & date stamp which preferably also changes all the time), preferably like in all the secure control communications with the Security system of the administrator's computer, and the Security System on the administrator's computer or the gateway decrypts the data and allows it to pass only if it is legitimate and thus can discover immediately when some illegal communication is happening. Another possible variation is to use for example the IPSEC protocol for the communication between each computer for example to the gateway and/or administrator's computer, in combination with control information of the Security System that describes at least the amount of data that is sent out each time, so that no packets can be changed or replaced with other packets or replayed. In this case, preferably VPN (virtual Private Network) and IPSEC is required for communications within the internal network, and preferably the gateway computer opens it. This way, the IPSEC and all its negotiations are done by the Security System, and thus attackers cannot use the communication interface below without having to go through the Security System for communication. However, in order to enable the checking of mismatch between what was sent and what was received, preferably the security system is able to monitor and take into account for example re-broadcasting of presumed lost packets in the socket layer. Of course, more than one administrator/gateway computer can exist. Another possible variation is to use for example for each computer (or each group of computers) a modem or network card or other communications device (111 in FIG. 1) capable of monitoring at least the amounts of data sent out so that this communication device can preferably report back to the Security System of the computer how much data actually went out, so that preferably the communications can be immediately blocked and an alert issued if the amount of actual communication does not fit the amount reported by the Security System of that computer. (Preferably the blocking in this case is done by the Security system, however another possible variation is that it can be done also by the communications device itself, or by the administrator's computer or the gateway computer in organizations where all the traffic goes through them). This has the advantage that it can be used also for single computers or small groups of computers that don't use central control, however it could be used also in organizations with central control. Again, this is important and can be used also independently of the other features of this invention to find cases where the actual amount of data sent-out does not fit the amount reported, even for example the amount reported by the dialer of the operating system. Another advantage of this is that there is no problem of falsifying the origin addresses in packet headers, since all packets that reach the modem or network card come from a single computer coupled to it. Additional variations can also be used here like those described above in the case of these checks being done at the gateway or administrator's computer (As explained above, it should be clear that in the above variations functions that can be done on the administrator's computer can be done in addition or instead at the gateway computer or vice versa or they can be the same computer). Preferably if such a communication device is used, it has a firmware that cannot be changed by software but only by physical replacement, in order to reduce the chance for hostile takeover of this device itself, and preferably the communication device is also capable of generating automatically various reports on outgoing and/or incoming data and preferably the security system makes sure that no other applications can interfere with the device driver of the communication card and thus mess with these reports. Another possible variation of this is for example reporting similarly also how much data went in. Another possible variation in organizations is that reports about such cases of incongruities are reported automatically by these communication devices also (or instead) for example to the system administrator. Of course, various combinations of the above and other variations can also be used.

Figure 2:
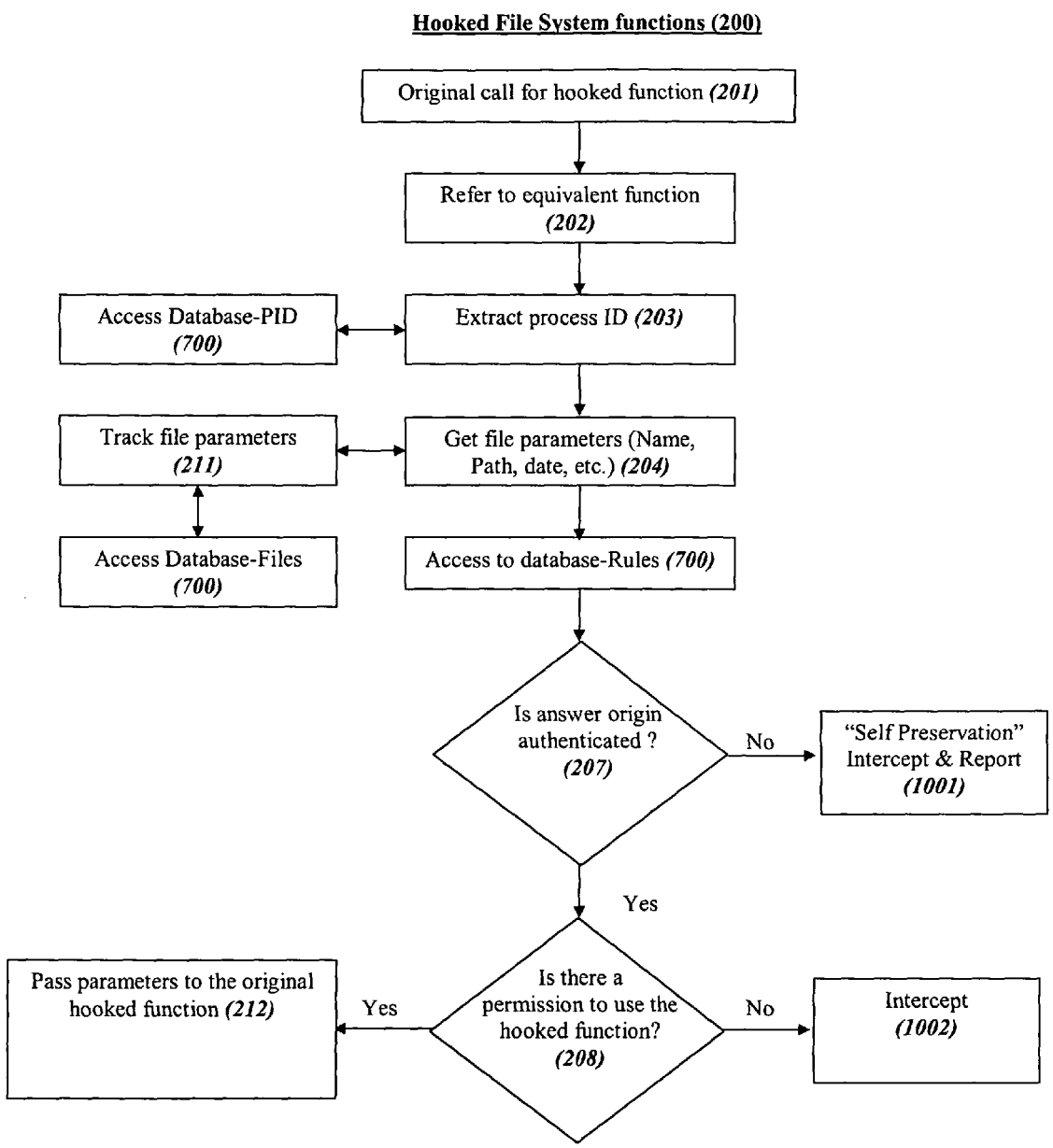
FIG. 2 shows in more detail a flow diagram of a preferable way the monitoring and capturing system interacts, monitors, checks and authorizes file hooked functions of the computer's operating system that may be preformed by an application.

FIG. 2 shows a preferable method for monitoring, checking and authorizing access to hooked functions that are called due to a disk related action (201) (such as for example file open, file read, file write, file change, disk read, disk write, disk format, etc.). Preferably the function is tunneled to the proper method of access (202) (read, write, query, etc.). Then the Security System retrieves caller's identity (203), retrieves its relevant information from the database (700), if needed, and retrieves the required file action parameters (204) (such as file name, path name, etc.). The parameters are tracked (211) and, if needed, relevant parts are stored in database (700) for further use (for example for statistics). If needed, an access to rules settings in the database (700) is made to check whether the current action is permitted, and the answer's origin is authorized to prevent hacking of the Security System (207). (For example, if the program tries to access a file within its own directory or subdirectory, it is not necessary to access the database). Also, preferably the Security System can take into consideration also if the action was initiated by the user or by the application, as described in FIG. 1b. If hacking was spotted, the Security System preferably proceeds to special termination process (1001). If origin of answer is authenticated as coming indeed from the database, the Security System performs a check whether the action is permitted. If not, the Security System can for example ask permission from the user, or terminate the process, or tell it that something does not exist, or tell it that the request has been done (without actually doing it), or do the above things if the user has not agreed, or choose other actions, preferably depending also on the amount of visibility wanted by the user (1002), and if authorized it passes on the parameters to the original hooked function (212), and, if needed, the database is updated with the new authorization. Also, it should be noted that this and the other figures, and especially the flowcharts are just general examples, and various steps can for example change or be in a different order. In this and preferably also with other types of hooked functions, preferably the security system also prevents applications from accessing directly lower level functions that can access devices, so that for example in case of disk access, applications are also prevented from accessing directly the lower level file system of the kernel or the actual device driver that physically accesses the hard disks (and preferably similarly with device drivers that can access other storage media). Preferably this is done for example by hooking also the lower-level functions and preventing for example calling them not through the normal kernel interface.

Figure 3:
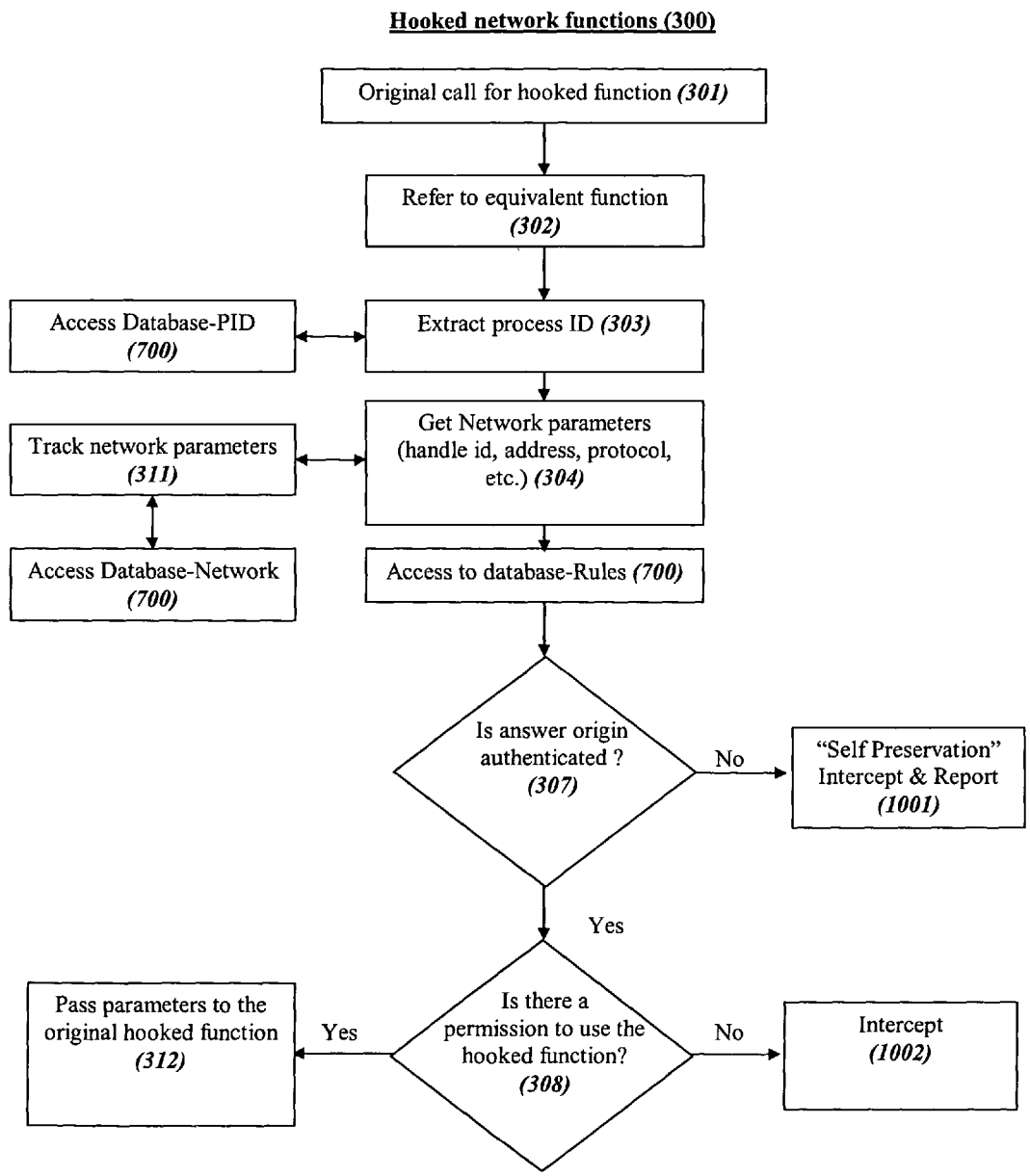
FIG. 3 shows in more detail a flow diagram of a preferable way the monitoring and capturing system interacts, monitors, checks and authorizes network hooked functions of the computer's operating system that may be preformed by an application.

FIG. 3 shows a preferable method for monitoring, checking and authorizing access to hooked functions that are called due to a communication related action (301) (such as open connection, close connection, send, receive, etc.). Preferably, the function is tunneled to the proper method of access (302) (send, receive, etc.). Then the Security System retrieves caller's identity (303), retrieves its relevant information from database (700) and retrieves required communication action parameters (304) (such as handle id, address, protocol, etc.). The parameters are tracked (311) and, if needed, relevant parts are stored in database (700) for further use (for example for statistics). Also, preferably, when possible, the Security System can take into consideration also if the action was initiated by the user or by the application, as described in FIG. 1b. If needed, an access to rules settings in the database (700) is made to check whether the current action is permitted and the answer's origin is authorized to prevent hacking of the Security system (307). If hacking was spotted the Security System preferably proceed to special termination process (1001). If origin of answer is authenticated as coming indeed from the database, the Security System performs a check whether the action is permitted. If not, the Security System can for example ask permission from the user, or terminate the process, or tell it that something does not exist, or tell it that the request has been done (without actually doing it), or do the above things if the user has not agreed, or choose other actions, preferably depending also on the amount of visibility wanted by the user (1002), and if authorized it passes on the parameters to the original hooked function (312), and, if needed, the database is updated with the new authorization. In this and preferably also with other types of hooked functions, preferably the security system also prevents applications from accessing directly lower level functions that can access devices, so that for example in case of network access, applications are also prevented from accessing directly the actual device drivers that physically accesses the communication channels (and preferably similarly with device drivers that can access other storage media). Preferably this is done for example by hooking also the lower-level functions and preventing for example calling them not through the normal kernel interface. As explained above, This is very important since normal firewalls only check access to the standard winsocket, and thus for example any Trojan horse that has its own built-in communication socket and/or that for example installs some driver that accesses directly the network communications card or its driver—could bypass the entire firewall.

Figure 4:
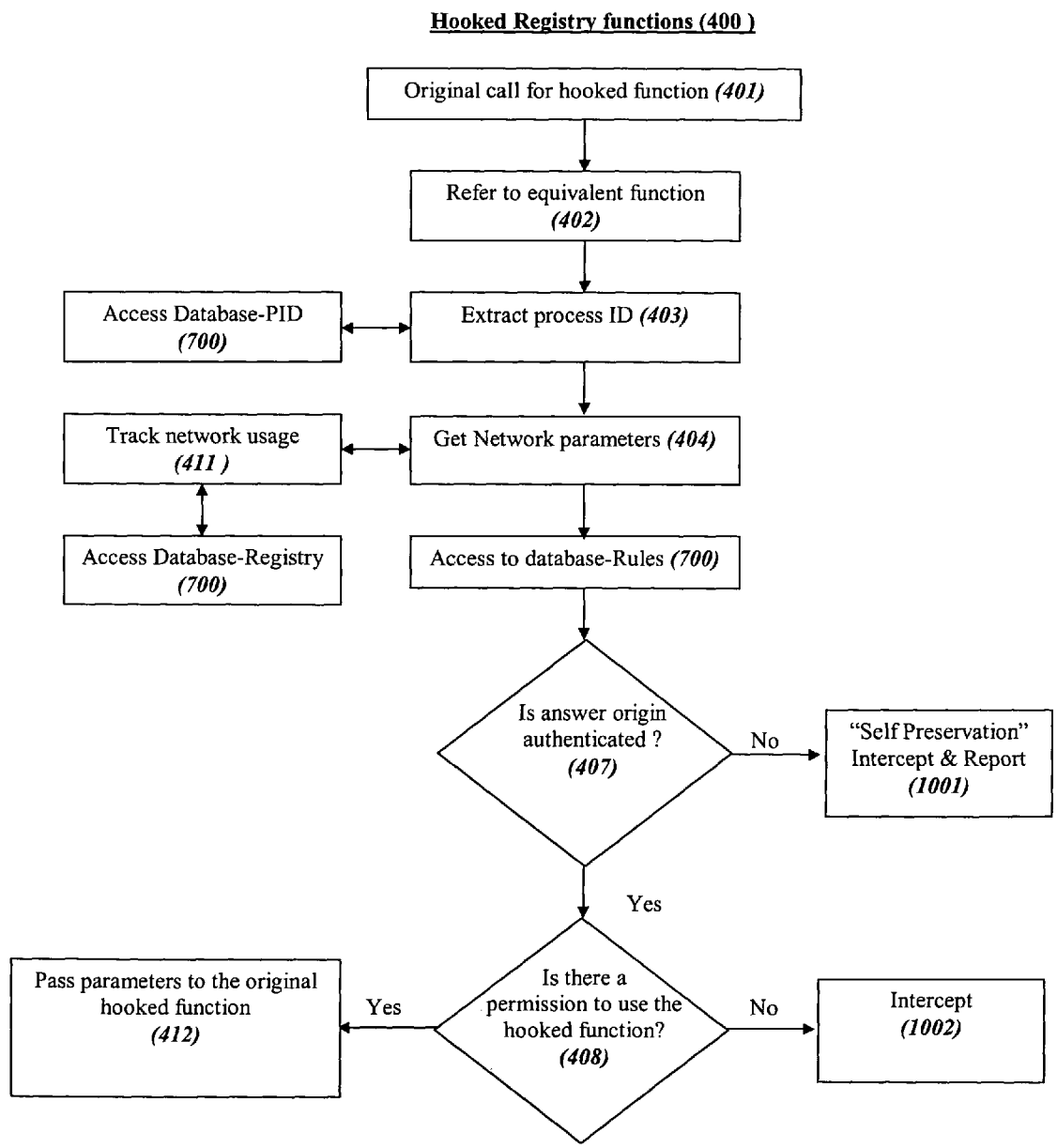
FIG. 4 shows in more detail a flow diagram of a preferable way the monitoring and capturing system interacts, monitors, checks and authorizes registry hooked functions of the computer's operating system that may be preformed by an application.

FIG. 4 shows a preferable method for monitoring, checking and authorizing access to hooked functions that are called due to a registry related action (401) (such as for example read, write, change, etc.). Preferably, the function is tunneled to the proper method of access (402) (read, write, etc.). Then the Security System retrieves caller's identity (403), retrieves its relevant information from database (700) and required registry action parameters (404) (such as key, value, etc.). The parameters are tracked (411) and, if needed, relevant parts are stored in database (700) for further use (for example for statistics). An access to rules settings in the database (700) is made to check whether the current action is permitted, answer's origin is authorized to prevent hacking of the Security System (407). If hacking was spotted the Security system preferably proceeds to special termination process (1001). If origin of answer is authenticated as coming indeed from the database, the Security System performs a check whether the action is permitted. If not, the Security System can for example ask permission from the user, or terminate the process, or tell it that something does not exist, or tell it that the request has been done (without actually doing it), or do the above things if the user has not agreed, or choose other actions, preferably depending also on the amount of visibility wanted by the user (1002), and if authorized it passes on the parameters to the original hooked function (412) and, if needed, the database is updated with the new authorization.

Figure 5:
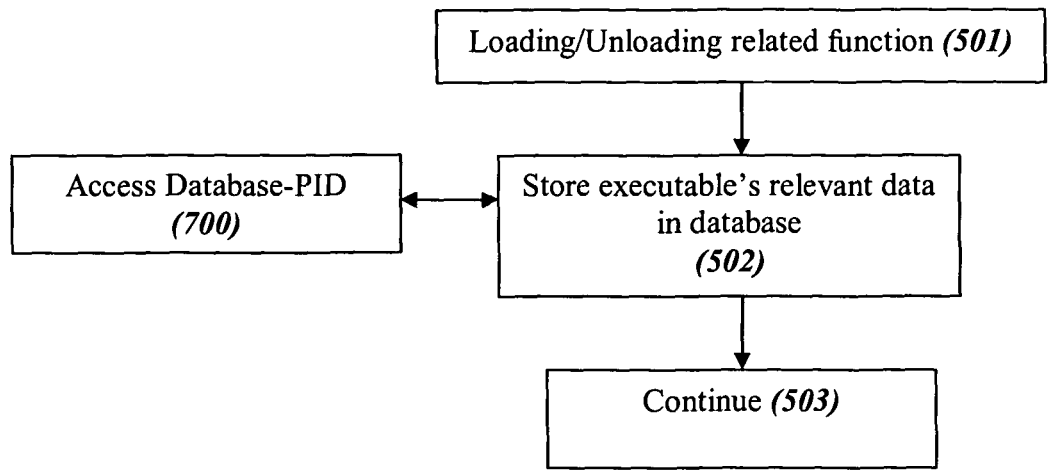
FIG. 5 shows what preferably happens when executable files are being loaded for execution.

FIG. 5 shows what preferably happens when any executable files are being loaded for execution (501) by the operating system. The Security System is notified about it and checks it before it actually starts running. Furthermore, the file is being accessed in an earlier phase (see FIG. 2) when the Security System permits the access to the file (for example, if format.exe was denied it won't reach this phase) as it is being accessed before loading into memory (see FIG. 2). The Security System preferably tracks file parameters and relevant data (502) (such as for example process id (PID), threads, allocated memory, etc.) for further use, stores them in the database (700) if needed, and passes on the parameters.

Figure 6:
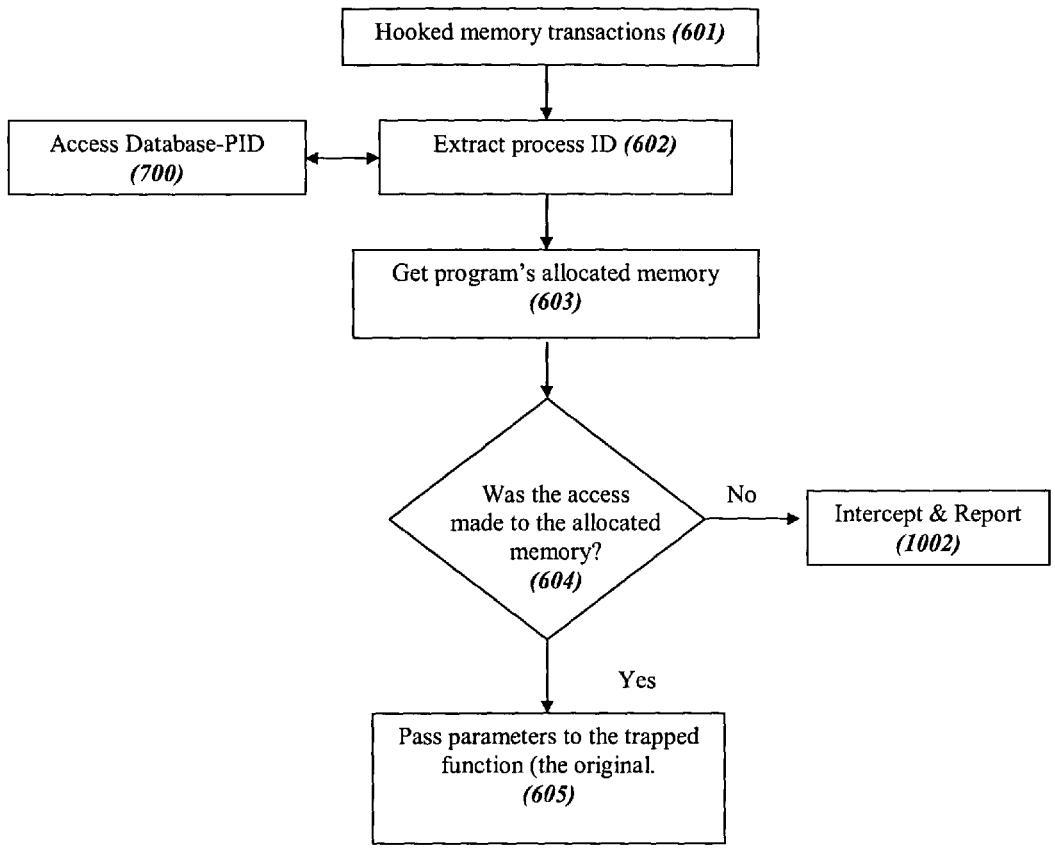
FIG. 6 shows in more detail a flow diagram of a preferable way the monitoring and capturing system interacts, monitors, checks and authorizes memory related functions of the computer's operating system that may be preformed by an application.

FIG. 6 shows a preferable method for monitoring, checking and authorizing access to hooked functions that are called due to a memory related action (601) (such as for example read, write, etc.). Then the Security System retrieves caller's identity (602), retrieves its relevant information from database (700), gets its parts (libraries, etc.) and its self-allocated memory (physical, virtual, etc.) (603), and checks if the process exceeded its memory borders (604). If it exceeded it, the Security System can for example ask permission from the user, or terminate the process, or tell it that something does not exist, or tell it that the request has been done (without actually doing it), or do the above things if the user has not agreed, or choose other actions, preferably depending also on the amount of visibility wanted by the user (1002), otherwise it passes on the parameters to the original hooked function (605). Preferably this feature is implemented to the extent possible since its implementation may be limited or partially limited on various operating systems. The optional additional hardware described in FIG. 8 might also be useful in this context if needed.

Figure 7:
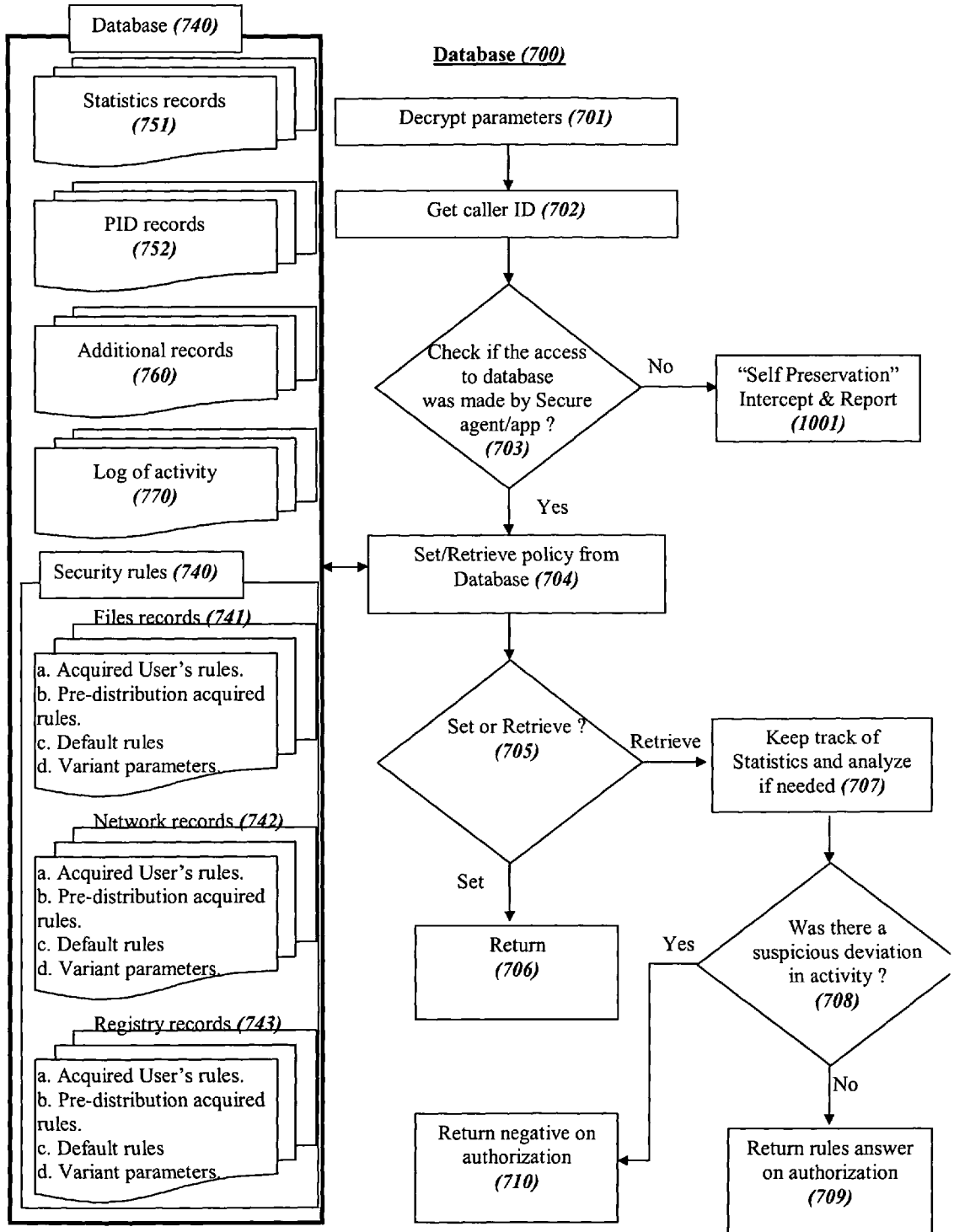
FIG. 7 shows in more detail a flow diagram of preferable main parts and methods of the Security System database, permission and analysis processes.

Referring to FIG. 7, we show preferable main parts and methods of a Security System database. The database or parts of it are located in computer's memory and in storage media. Any access to the database is encrypted (701) and its origin identified (702). The authentication is checked (703) and if hacking was spotted the program preferably proceeds to special termination process (1001). If the access is authenticated the database may set or retrieve information (704) from or to the records (740) which preferably contain statistics records (751), Process ID (PID) records (752), additional records (760), log of activity (770) and Security rules (740) which preferably contain info such as for example file records (741), Network records (742) and Registry records (743). Each group of the rule records preferably contains the following information: acquired user's rules, pre-distribution acquires rules, default rules and variant parameters (as described above). If the request is for storing information, the request is performed and returned to caller (706) (one of the Security System inner functions). If the request is for retrieving information, the following preferably occurs: The database keeps track of statistics and analyzes (707). If the Security System spots any suspicious deviation in activity, the answer returned to the caller function is negative and the appropriate explanation passed through (710) (this action is performed when handling information that is not inner security database such as for example PID-752, etc.), otherwise it returns the answer that was retrieved from the database (709).

Referring to FIG. 8, another possible variation is that the Security System may also include an optional hardware element (800) which gathers (804) and/or logs (805) monitored hardware port accesses (803), DMA (801), IRQ (802), etc.

Preferably the monitoring hardware mainly monitors access to storage devices (especially hard disk controller) and access to network devices (such as for example modem, network cards, etc.). Preferably, the monitoring hardware has an interface (811) for transfer of information from the Security System's software (104) to said hardware element (800) (such as for example through accessing read and/or write ports in said hardware element (800)) and for immediate feedback to the Security System's software (104) (such as for example through accessing read and/or write ports in said hardware element (800), through interrupts, etc.) so that it can alert the Security System's software (104) to any events that have been defined in the built-in local database (806). The comparison of events between the software monitoring and the hardware monitoring can preferably be done by either the hardware element (800), by the software part of the Security System (104) or by both. When either the hardware element (800) or the Security System's software decides that unknown access has been made to the above monitored hardware without apparent corresponding event on the top system level as monitored by the Security System software (104), the event is intercepted and reported. Monitoring and catching these events enables the Security System to further close any remaining loopholes in the operating system and programs that may override agents hooking, and ultimately even catch and intercept even backdoors in the operating system if they exist.

Figure 9:
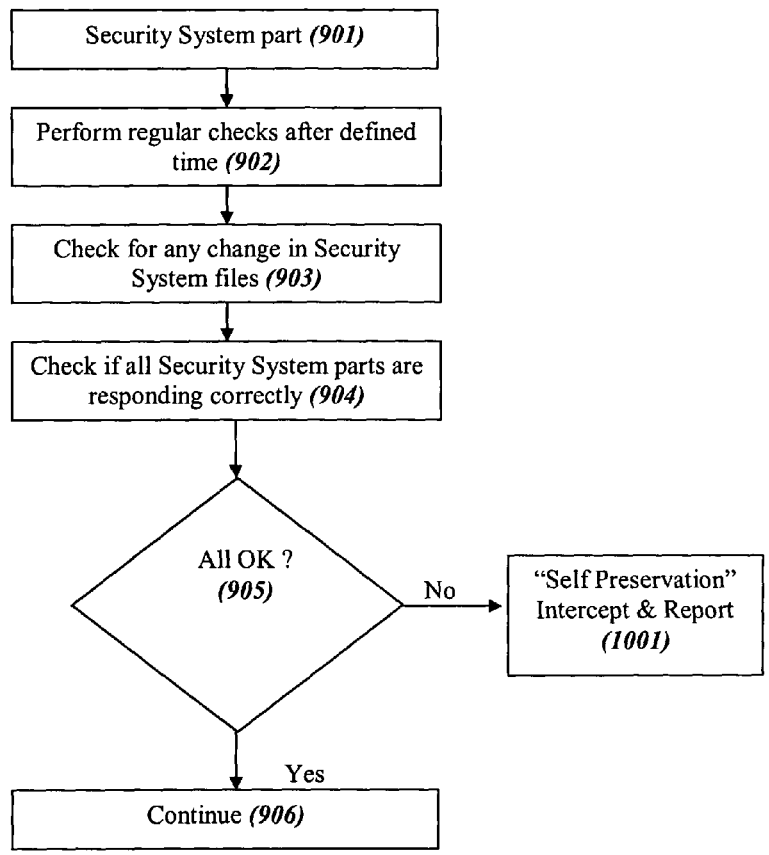
FIG. 9 shows in more detail an overview of a preferable self-preservation method.

Referring to FIG. 9, we show an overview of a preferable self-preservation method. Any Security System part that is being called (901) performs a regular check every defined time (902) for all Security System files integrity (903) and its running functions' (as described in FIG. 1) integrity (904). If a deviation is found (905), it preferably informs the user for full understanding of the situation and performs a Self-preservation interception and report (1001). In addition to this, in order to protect itself in memory, preferably the security system defines a part of the physical memory so that no other process can access it except by using a limited number of calling gates (such as for example when calling one of the hooked functions), and any other attempt to access this memory area for example for reading or writing causes a CPU exception which transfers control to the Security System. Since the Security system can know from this which application tried to "attack" it, the security system preferably initiates "anti-hacking" measures, such as for example disabling the attacking part of the process, terminating the process, destroying the process's environment, etc.

Figure 10:
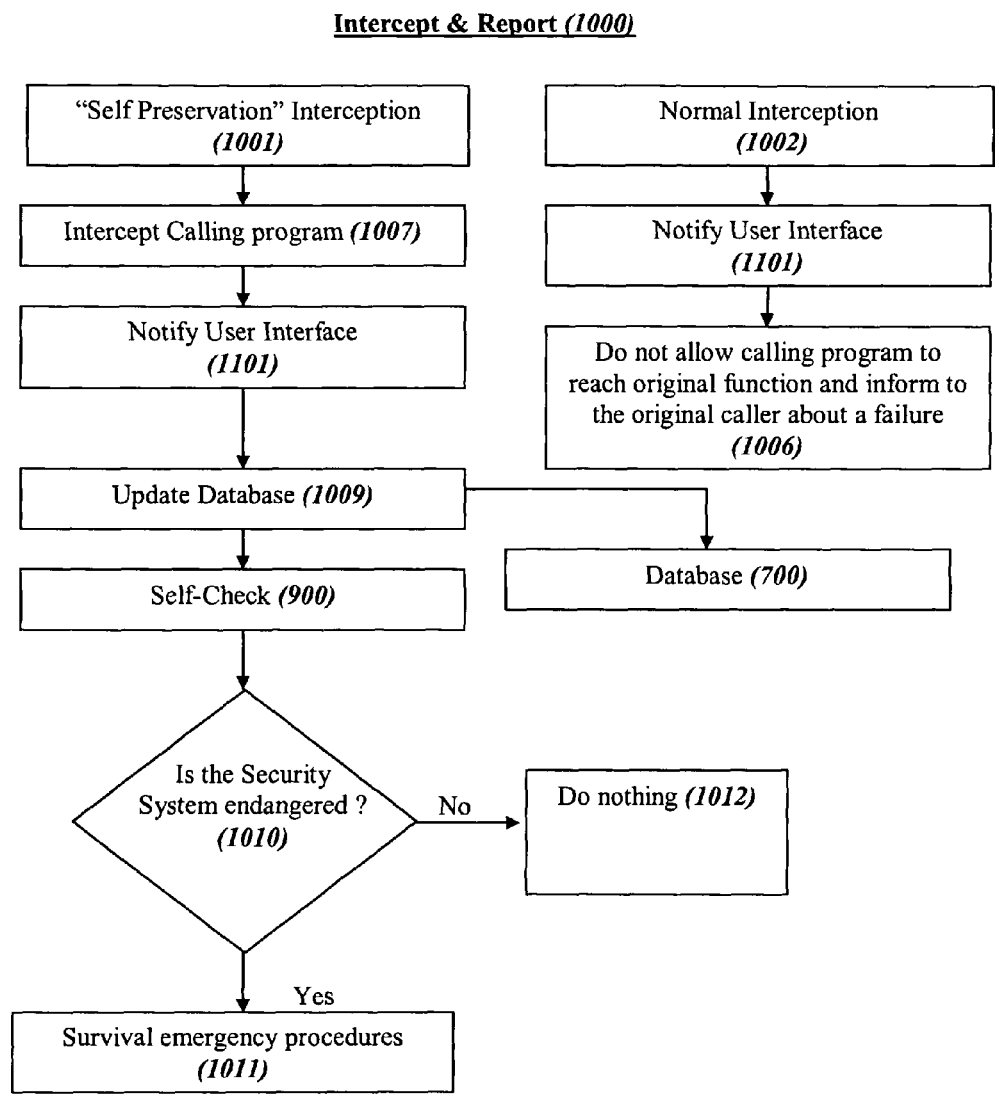
FIG. 10 shows in more detail a flow diagram of a preferable method of interception process.

Referring to FIG. 10, we show a preferable method of the interception process. It preferably contains two major interception routes: The first is a normal interception (1002)—it is used when an executable tries to perform an unauthorized activity. In that case it can for example notify the user (1101) (as described above), blocks the parameters from reaching the original function (1006), and can for example inform the original caller (the program that requested the function) about function failure. The second is a Self-preservation interception (1001). It is used when the Security System detects an intrusion of any kind by an offensive program or a hacker. In that case preferably it terminates the offensive program immediately (1007) (such as for example unload from memory, etc.) (Method of termination may be different from operating system to another), and the Database (700) is modified so it marks the offensive program and/or its files accordingly (1009) (such as for example not allowing the access to them, etc.). A self-check is being performed (900) (as described in FIG. 9) and if the Security System is endangered (1010), it starts Survival emergency procedures (1011) (such as for example reinstall, shutdown parts, reload, etc.). If not, it continues monitoring (1010). Although it may seem from the diagram that in certain cases there might occur endless loops, this is not the case in reality, it only seems so because the diagram is simplified.

Figure 11:
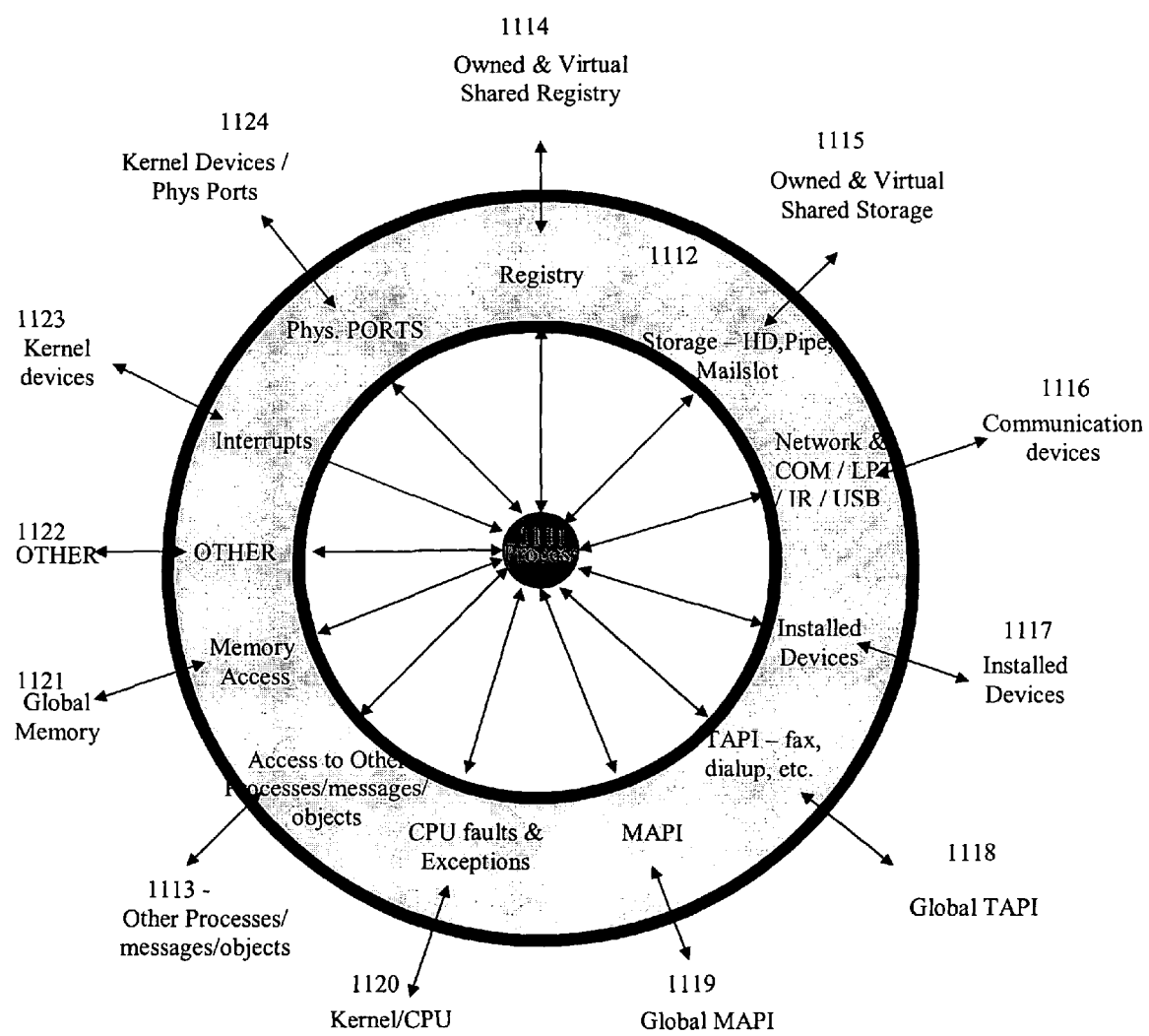
FIG. 11 is a graphic illustration of a preferable way in which processes may be segregated and controlled, preferably in virtual environments (VEs).
Figure 11A:
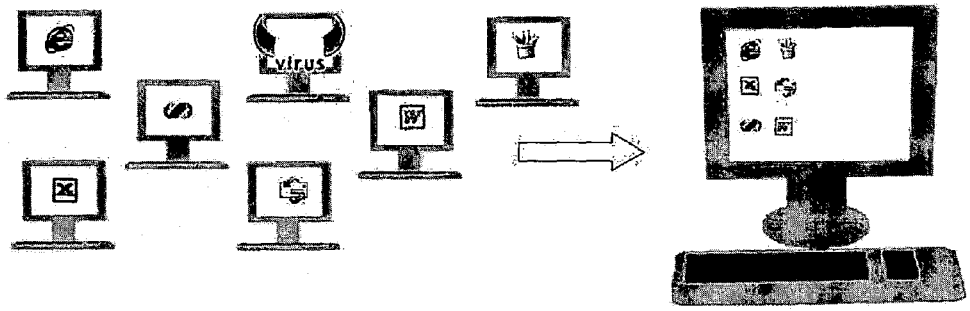
FIG. 11a is a visual illustration of keeping each program in a 'Bubble' of virtual environment (VE).

Referring to FIGS. 11 and 11*a*, we show a graphic illustration of a preferable way in which processes may be segregated and controlled. Whenever a process (1111) attempts to access other processes or their natural environments (1113) or possibly important system resources (1114-1124), it has to go through the Security System's interception and decision engine, so that practically a virtual environment (referred to below as VE) or virtual computer (1112) is created around it. However, it should be noted that this graphic illustration is just a possible example. Not all of these functions are necessarily implemented, however, preferably, most or all are implemented. (Category 1122—other—refers to other possible resources that may be relevant for example in other operating systems or other CPUs, or for example other devices or other virtual environments). A more extreme possible implementation of this concept (as illustrated also in FIGS. 11*a* and 12) is for example that every time a new program is installed, it is given the illusion that nothing else exists on the computer but itself and the operating system and the computer resources (For example software and hardware) that it is allowed to see, so that only the user and certain programs such as for example the relevant parts of the Windows directory explorer and privileged programs given special explicit permission by the user or by predefined rules can see the real directory structure and resources. Preferably these permissions can be given either at the level of an entire program, or for example at the level of segments or parts of the program, so for example the part of explorer that deals with the screen does not need to be given permission to access the directory system. This can further limit for example the extent of damage that can be caused by various exploits. This way, it is like an infinite set of new installed computers, each with a clean and new operating system, and each computer runs only one program: For example, one runs Internet Explorer, a second runs Windows Word, a third runs DOOM II, and so on. However, as explained for example in function no. 1 of FIG. 1, of course more than one program can share the same Virtual Environment (referred to below as VE), since more than one executable can be for example in the same directory. This means that of course, like in the other variations of the automatic segregation, the user preferably sees the normal desktop appearance, as is graphically illustrated for example in FIG. 11*a*, which includes various applications regardless of the VE (Virtual Environment) boundaries, and similarly the user of course preferably sees normally for example the list of installed programs for example in the Windows start menu (i.e. preferably the merged view, as explained below). Similarly, when viewing the directory structure itself preferably the user sees only the normal directories and/or files (preferably including for example the registry) and/or other resources, preferably as they would be if there was no actual segregation to virtual environments, so that the user does not have to see for example additional directories or subdirectories and/or files that are needed for the actual implementation and/or enforcing of the virtual environments, such as for example directories and/or files needed for the implementation of the "copy-on-write" principle explained in clause 8 of FIG. 1 or for the implementation of Sub-VEs, as explained below. This is preferably implemented by automatic merges of the various VEs, as explained below. However, as explained below, another possible variation is that when for example a file exists for example in c:\ only virtually but exists really only in one or more VEs then the user does not see it as if it exists in c:\, especially for example in the mode where the user can see the real directory structure. Also, if there is for example a crash and the user needs to repair the disk structure for example from a diskette or from commandmode only, using a standard disk fixing utility might for example confuse the user since he might suddenly be exposed also to files and/or directories that are related to the actual lower level implementation and/or enforcement of the VE segregation. Therefore, in this variation preferably the Security system includes also its special rescue and/or repair and/or maintenance utilities so that for example questions can be displayed to the user through the merged view. Another possible variation is that the user can see also the special directories or files needed for the actual implementation or enforcing of the VE system or at least some of them, and/or the user can for example switch back and forth between a mode where they are hidden and a mode where they are revealed, thus preferably seeing the real directory structure. This can be very convenient, so that in this variation preferably for example the user sees the merged view for example at the desktop and when viewing the list of installed programs, but when looking at the directory structure for example in the explorer or with a DOS or CMD window can preferably see the real directory structure and files, preferably without seeing the merged files, and can preferably switch between this mode and the merged view mode. (As explained above, another possible variation is that when the user looks at the directory structure he can see for example both the merged view and the actual directories in which the virtual files really reside). Anyway, regardless of which variation or which exact implementation is used for the virtual environments, it should be emphasized that preferably there is a single installation of the OS with shared resources, and preferably the user can see a merged view of the Virtual Environments and can preferably work freely without VE limitations.

If the user wants to run for example a virus-scan program, which preferably has no VE limitations, then (apart from the fact that the user or for example the administrator needs to give it these access rights, as explained below), preferably the virus-scan program can access freely all the real files and directories, including for example files and/or directories created for the implementation of Copy-On-Write or of subVEs. This is desirable, since the user should preferably know of any known viruses that exist on the computer, even if they are in a limited VE or for example sub-VE or for example Copy-On-Write file (or other special files or directories that are needed for the implementation of the VEs), since the user (or the administrator) might for example at least in some cases want to remove the entire infected VE (for example if it is a directory and/or other resources that belongs to the virus itself). This is also preferable as an additional precaution, since the user might for example inadvertently give a virus access rights outside its VE or be for example cheated by misleading questions in the dialogue box as explained in the reference to FIG. 1b, so leaving a known virus even when it is isolated is not desirable. This means that when the anti-virus program reports a virus or asks the user for a confirmation for deleting a virus, the user might be exposed again also to the special files and/or directories. This is another reason why preferably the user should be made aware of the existence of such special files and directories and preferably the user can switch between a mode that shows them and a mode that does not show them. (If, on the other hand, the user is never allowed to see these additional files or directories, this means that preferably either the Security System comes with its own special anti-virus program or programs, or for example it interferes whenever the anti-virus program wants to show the user any of these special files or directories, and then for example the security system can answer automatically instead of the user and/or for example questions can be displayed to the user through the merged view. However, this variation is less preferable since it might involve deciding instead of the user at least in some cases, or hiding from the user for example the fact that a virus was discovered in some sub-VE or in some Copy-On-Write file and removed. This also would contradict the principle of letting the user know what is really going-on on his computer. In addition, in this variation if the user for example decides to run an independent anti-virus program in command-mode only or from a diskette, this might again cause inconsistencies). On the other hand, since the anti-virus program might need for example to scan various registry entries, preferably the security system lets the anti-virus program see properly at least the merged version of the registry. Another possible variation is that the Security System for example lets the antivirus run automatically each time on the next VE, seeing each time only the scope of that VE, but that is less preferable since it could have for example the side effect that the user would see each time the antivirus reporting again for example that it scans the same sequence of directories, (for example c:\, c:\windows, etc.), and for example sometimes a virus is found there (because there is a virus in the currently scanned VE), and sometimes not, or after the virus has been removed it reappears, etc. Another possible variation is that the Security System runs either a special antivirus or for example interferes when the antivirus shows results and then for example reports the results to the users in terms of VE's—for example this and this VE was found to contain a virus, and/or for example asks the user if he want to remove the virus or for example remove the entire VE. Similar principles preferably apply for example when running for example scandisk or similar programs, so that preferably one or more similar variations are used in this case. However, as explained in other places in the present application, at least in some embodiments preferably at least part of the Security System is activated even when the computer is booted from other sources, such as for example a diskette, a CD, or another disk or partition. And since the Security System is preferably installed below the OS, this means of course that preferably the security system or at least part of it is active of course also if the computer is started for example only in command mode for example without Windows running, or for example if Windows is started in safe-mode.

For the implementation of the VE segregation preferably the Security System is the first thing installed after the operating system, and the security system preferably relies mainly on identifying if the user or the program initiated each security-sensitive action in order to decide automatically if to allow it or not, as explained in the reference to FIG. 1b. (However, it should be kept in mind that in the variations or modes where the user is shown the merged view of the directory structure and/or file system, of course the dialogue box is preferably also consistent with this). This way preferably the amount of nagging to the user is reduced to the minimum. However, this still preferably involves additional safeguards, as explained for example in the references to FIGS. 1 & 1b and in other sections. So since the user can see the entire directory structure (or for example at least the allowed parts of it if he has less than root privileges) and the program can only see its own VE (Virtual Environment) unless explicitly given additional rights, preferably all of the actions initiated by the program are automatically limited to the scope of its own VE. As explained in the reference to FIGS. 1 & 1b, preferably the VE contains mainly its own directory with its sub-directories, but preferably the program or programs in the VE can access also essential non-strategic OS directories or files, preferably for read-only, and if they try to change these files, preferably the file that needs to be changed is copied to the VE and changed only there. However if we take this to the extreme, it creates the problem that when the user tries for example to run an anti-virus scan program or any other program that needs access for example to the entire disks or at least to other directories in order to do its work properly, the program will be able to scan only the scope of its limited VE, and the user might not even notice that the program actually didn't do its job. So, again, preferably there is a mechanism that allows the Security software to ask the user about it and/or at least a mechanism that allows the user to explicitly give these programs the additional access rights that they need, as explained in the reference to FIG. 1b. Another problem is that some programs that can access the Internet, such as for example MSIE, Windows Media player, and others, may behave like integral parts of the operating system or at least might already be installed automatically during the installation of the operating system itself. Therefore, in order to isolate them into their appropriate VE's, preferably the Security system uses various heuristics in order to define the boundaries of their VE's, and/or for example uses predefined rules. These heuristics can include of course automatically limiting them by default to their default directories and subdirectories, as explained for example in the reference to FIG. 1, and for example limiting their access to needed DLLs that are in appropriate System areas, to Read-only access. For special programs such as for example Microsoft Word and/or other Microsoft Office programs (which are dangerous also because they can access critical or secret user data files and because they can also access the internet and because various exploits have already been used on them in the past), preferably predefined rules are used anyway, even if they are installed after the security system, because they behave in many ways like an integral part of the operating system after they are installed and because they can show some behaviors that would be considered highly suspicious if a normal program performed them. For example, when Word is loaded, it can quickly access multiple directories, even in other drives. Preferably such behaviors are analyzed in advance for creating the predefined rules about them, since such behavior might for example be used for spying purposes or for causing damages, if for example some Internet exploit (such as for example some buffer overflow) manages to take over Word. However, since Word is running in its own VE and therefore cannot see any directories and/or resources other than the resources it is allowed to see, the scope of such scanning behavior is automatically limited anyway. On the other hand, lets consider for example what happens when Word is being installed: Since "C:\My Documents" is created by Word itself and it can even insert various files in it then, it could normally be interpreted that this directory is part of its VE, so it can freely access any ".doc" files it likes in this directory. Now consider for example what will happen if Word (which can also access the internet) is compromised for example by buffer overflow or for example by an exploit using unsafe active-x and then immediately deletes for example all the ".doc" files. Of course it can do it because it is in its own VE. Or for example the compromised Word process in memory changes for example the disk copy of Word.exe, which is within its VE, and inserts for example a slow Trojan horse which for example secretly sabotages each file as it is being saved (as in the example given in the reference to FIG. 1b), or for example deceives the user into giving it additional access outside it own VE. This is another example why preferably additional safeguards are also used, as explained in the refs. to FIGS. 1 & 1b. Apart from for example preventing such changes in executables, another possible variation is for example that after an installation of a program has finished in its VE, any further changes to files in this VE are automatically copied to another sub-VE or related VE or child-VE, which is preferably subject to even more limitations than the original VE. This means of course that similarly any new files that are created in that VE are preferably actually created in the sub-VE. Preferably programs in the sub-VE have no access to their creating VE, but from the point of view of the creating VE the sub-VE appears to be merged in the VE. This sub-VE can be called also for example spill area. The connection between such related VEs can be for example through pointers (preferably reciprocal) and/or table of relations and/or through encryptions. Of course, if the Operating System allows various authorizations to different users, such as for example root user and normal users, the various VEs are preferably limited also within each user space. Another possible variation is to decide for example by predefined rules or by stricter VE rules, that Word cannot even access directly or see any ".doc" files that were saved by the user. However even this is not safe enough without the additional safeguards, since Word for example saves many copies of ".doc" files in temporary files, and since this saving is initiated by Word itself, these files are within its own VE. So now if Word for example becomes compromised for example by buffer overflow, the hostile code might for example make it send out on the Internet all the temporary doc files it can access. And like in the above example, without the additional safeguards, the hostile code can still for example change the disk copy of Word.exe and start sabotaging each time the current ".doc" file. In addition, this implementation still has the same problems as discussed in the reference to FIG. 1b, that if the user wants to run for example in any of the Office programs Scripts that can really affect other files, he needs to be able to give these programs or at least these scripts additional access rights. Another possible variation is that when a new program is being installed the user has the option of choosing for example new VE (Virtual Environment) for that program (preferably this is the default), or for example allow it to become part of an already existing VE, so for example if the user is sure that this is indeed a legitimate update of Word, he can allow the update to update and/or inherit all the current VE of Word, or for example allow it to have free access to the entire computer, if for example the user is sure that he is indeed installing now a Windows update for example from an original Windows CD or for example a system update or security patch that he has downloaded directly from Microsoft. So if for example the user installs an anti-virus program that needs to be able to scan the entire disks, he needs to install it at the highest level. But this, again, leaves the user vulnerable to installing by mistake programs at the highest access level that should not be there (for example a malicious program that pretends to be an anti-virus program), so, again, the additional safeguards are preferably also used. And also, preferably the user is able to correct mistakes for example by moving such a program back into a limited VE. Another possible variation is for example not to ask the user anything or almost anything and rely mainly on the VEs, and preferably also on additional safeguards, so that for example preferably at least some potentially highly dangerous activities are automatically blocked, even if the user apparently authorized them to the perpetrating program (or for example some are automatically blocked and some are decided by asking the user). (Another possible variation is to rely for example only on the VE and thus not ask the user for example about Internet access by programs that are limited in their VE and have not been given any additional access rights, but this embodiment is less preferable, since it would enable for example a compromised Word.exe to send files outside without permission, or a Virus for example to further propagate itself, or for example a zombie program to participate in a DDOS attack (Distributed Denial of Service) or become for example a relay station for spam (as is done for example by the SoBig worm), or a malicious program for example to simply take over the Internet connection and for example waste or block most or all of the bandwidth). However, If the user is an organization, then for example the system administrator might have much more control, for example as described in any of the relevant variations in the reference to FIG. 1b. In that case the Sys admin can be for example the only one who authorizes programs to be installed with access rights outside their normal VE, and then there is no need for the Security System to tell the individual PC users for example if a program cannot function properly since it is trapped in its VE. On the other hand, since the administrator might also make mistakes or his computer might be for example compromised, preferably the additional safeguards are still applied for each computer for example when programs that have higher access rights try to do highly dangerous or suspect activities, or when the user gives such access rights to programs (for example by mistake or on purpose) for example through the dialog box. However, as described in the reference to FIG. 1b, one of the possible variations in this case is that all the warnings are for example sent to the System administrator's computer, and preferably only he can authorize them or not. (Of course the administrator can also mean for example a user who is logged-in as root or administrator on a single computer, so that for example some decisions, such as or example if to allow a new program to be installed without VE limitations can be made only when logging-in as the root or administrator on that computer).

Another possible variation is that the Security System and/or for example the Operating system can also alert the user and/or automatically prevent or take action for example if a malicious program tries to misuse for example the CPU resources and/or the free RAM memory and/or the free space of the disk (and/or other non-volatile storage devices) and/or for example creates on purpose an artificial load on disk activity, etc., since taking over one or more of these resources on purpose can easily cripple the system or freeze it or even crush it. This can be done for example by at least one of the following ways: Taking over the free disk space and/or creating false load on the disk activity can be prevented for example by a default quota for each newly installed application and/or for each VE (which preferably can be easily changed by the user if needed), and/or for example by detecting automatically suspect behaviors such as for example duplicating junk into large areas, rewriting again and again large areas or the same areas, etc. However, since such a malicious program can write data which cannot normally be identified as junk, preferably the identification is based mainly on statistical analysis of typical disk activities, so that for example sudden large usage of disk space preferably in combination with unusual various patterns or parameters of the activities or behaviors can be preferably identified as suspect. Similar analysis can be applied also to other resources, such as for example CPU, network or memory. Since it is very hard to decide automatically when a certain use of CPU or RAM resources is legitimate or not, preferably the Security System and/or the Operating System automatically shows to the user (and/or for example to the administrator in an organization, preferably with an indication of the relevant computer) for example on some part of the screen, for example whenever any of these resources become too low (preferably over a certain minimal period, so that normal short bursts do not create false alarms), or whenever significant deviations from normal statistics in these resources are detected, which applications are taking up most of these resources, preferably sorted in descending order of the resource consumption, and preferably also the percent they are using, and preferably also, to the extent possible, what they are doing, at least in general (preferably the VE of these processes is also indicated, so that the user can see easily if for example more than one program in a certain VE are involved in these activities). Similarly, the system preferably shows the user and/or the administrator also the programs that take most of the Internet bandwidth, preferably also in descending order, so that the user and/or administrator can easily notice for example if some program has unexpectedly started to take over the bandwidth without any apparent justification. And since an entire VE can preferably be removed by the user (and/or for example by the administrator if it is an organization) preferably instantly and without leaving any traces, as soon as such a problem is discovered it can preferably be instantly solved by simply removing the problematic VE, for example by a simple click of the mouse. However, like the other things that can preferably instantly also be undone (as explained in the section that deals with undo), preferably any deletion of a VE can also be instantly undone at least for a certain time period, so that if for example an entire VE is deleted by mistake, this can be instantly corrected. Another possible variation is to automatically detect suspect activities such as for example entering the CPU into useless loops or other suspect cyclic activities, etc. (However, such activities are preferably automatically detected by hardware in the CPU itself since that is much more efficient than having a software detect this). Also, preferably the OS or the Security System requests authorization from the user if a program requests Real-time Priority (or any other priority that can significantly slow down other processes), at least the first time it tries to get such priority or for example every time unless the user gives it such a privilege from then on.

If shared drives are allowed for example in a network, preferably either only the user is allowed to access files on shared drives on other computers, or for example each program is allowed to see and access in each shared drive only the same VE that it has on its own computer, so that for example it can see only corresponding subdirectories on the other computers or for example it can see only files and/or directories (and/or other resources) which it created or was given access to, so that the remote shared drive is regarded like any other local drive on the system. Another possible variation is that it can see the corresponding subdirectories only on shared drives that have the same drive letters as the drive or drives on which its own VE resides. As explained above in the reference to FIG. 1b and in function 9 of the reference to FIG. 1, preferably when a device driver attempts to be installed, the user or the administrator is explicitly asked about it, and preferably additional limitations are also used, such as for example limiting each device driver to only one specified type of device or devices, and/or associating at least some device drivers to only a certain program or VE. (For example, in order to know which ports belong to which devices, the security system preferably also controls and/or maps and/or monitors for example the bus and the cards for example for ports, memory, interrupts, DMA channels, types, and/or other resources, so that the security system knows more easily which ports and/or other resources belong to which devices and can for example prevent a driver from accessing a port or other resource that belongs to an irrelevant device or for example can let the driver access the device only in a limited way for example by using various manipulations). Since device drivers that handle for example the storage media (and especially the hard disks), device drivers that handle the computer's memory and device drivers that handle the communication channels, are typically the most strategically important, preferably the user is warned more explicitly about attempts to install such drivers, and/or for example only the administrator is allowed to authorize them, and/or for example such drivers can only come with the operating system itself and/or for example they are replaced by drivers supplied by the security system itself In device drivers that can access directly for example the hard disk or the RAM, enforcing segregation might be problematic, since by their very nature they can be used to by-pass the segregation rules. However, if for example some new game is willing to run only with its own screen driver, preferably, such driver is allowed to be used only within the VE of that game. If this screen driver is indeed limited to access only the screen and cannot leave for example side effects that can affect other programs while swapping out during multi-tasking, then there can be also embodiments where there is no need for permission from the user to install such device drivers. Another possible variation is that even for example drivers that go to the disk (and/or to other resources) can be associated with a certain VE, so if they are for example in ring 1 and the security system in ring 0, the security system decides which actions to allow them to perform according to the definitions of their VE. In other words, preferably the same VE limitations are applied also to device drivers. Another possible variation is that no application is allowed to install any drivers that access directly hardware elements, but only drivers that call the actual hardware drivers. Another possible variation is that for example no applications are allowed to install any drivers at all, however that is of course a much less preferable variation since it creates unnecessary limitations. Another possible variation is that for example only device drivers supplied by the operating system itself and/or duly certified and digitally signed device drivers that have not been changed since the certification are allowed, and no application is allowed to install any other device drivers, or at least any device drivers that can access for example the storage media, the memory or the communication cards. Of course, various combinations of the above and other variations can also be used.

Since all new programs are installed in their own VE (except when explicitly requested otherwise by the user), it becomes very easy to undo (or at least remove) any installation that has gone bad, for example because of some bug in the operating system or in the program or because it is a malicious program. So the user can very easily request an undo of the installation. However, if the user requests the undo after additional programs have been installed who's VE is for example based in part on the previous VE, then preferably either they are removed too, or for example the security system is able to automatically restore them after removing the problematic program with its VE. Another possible variation is that even if the user for example allows a newly installing program to inherit or overwrite an existing VE, the security system preferably first creates a virtual private environment copy of the modified directories (like described for example in Feature number 8 of the reference to FIG. 1), at least for a certain period, so that the user can preferably still request to undo this if he made a mistake, at least for a certain period. After this period preferably for example the VE limitations can be lifted or this VE is merged with the intended VE. Another possible variation is that the security system backs up all the changed files or directories at least for a certain time and/or keeps for example a rollback log of all changes that were made to the relevant files and directories or even of all changes anywhere in the disk, in order to enable the undo if the user needs it. Another possible variation is that even when the user allows a program to be installed without VE limitations, any changes in the entire hard disk after or during the installation, are completely undo-able at least for a certain time period (This can be done for example by keeping a roll-back log and/or by making the changes first at least for a certain period only virtually, like in the above variation). This is more comprehensive than the current "undo" feature that Microsoft offers after installing new software, since the current features only allow restoring the registry and system files, and even that not always completely, whereas any other changes to directories or files cannot be undone. An even more extreme variation is that for example any changes at all that happen on the hard disk (and possibly even on other connected media) at any time are completely undo-able at least for a certain time period, in a way similar for example to the undo feature in a single Word document. This can be enabled for example by creating a backup of each changed file or directory in another area at least for a certain time period or until for example the backup buffer becomes full and older backups have to be deleted automatically. Another possible variation, which saves much more space, is for example to keep preferably a rollback log of all changes for example of directories, files, FAT areas, and/or any other data (such as for example even any low-level changes in disk tracks), so that any changes that were made on the storage media can be rolled back by simply tracing back the log of changes. Preferably this rollback log is based on a circular buffer. Preferably this log is encrypted and is highly guarded and/or is kept also in more than one place, in order to reduce the chance of its destruction by mistake or by some malicious software. This way even if the user has made a horrible mistake and the entire system has been compromised, even the worst damage can preferably still be automatically undone. Since the Security System constantly guards itself and its files and preferably also these logs from any unauthorized changes, it is still safe to activate the undo when the user needs it. Another possible variation of implementing this is that even if the user requested installation without VE limitation, the new program is first installed in a separate VE, and only after a certain time period or after the user authorizes it (and/or for example after the security system checks various parameters to see that things seem ok), the VE limitations are lifted or this VE is merged with the unlimited VE. The various embodiments or features of this invention and especially those described here may be very useful for example in combination with the new Palladium system recently suggested by Microsoft (and/or similar systems that exists or will exist in he future), because the Palladium is like a safety vault in a bank, except that there is only one safe in the entire bank and programs can access this common safe and request various services from it only if they have some signatures that mean that they have been certified by someone and have not been changed since then. The concept of such certification can be very problematic because it means that programs have to be certified in advance in order to be allowed to run on the OS or request certain services from it, so it could make development of new programs problematic, and also various falsifications could insert dangerous Trojan horses or compromise the concept in many other ways. Also, the certification process itself might be of limited value even if for example during the certification various behaviors of new programs are checked, since it could miss the fact that some certified program is actually a Trojan horse designed to explode for example 2 years later or is designed to become for example a spyware for example only under certain conditions that are not discovered while it is being certified, or the certified program has for example numerous security flaws that can later be discovered and exploited. Or the certification might not include any behavior checks but rely only on identifying vendors with some Id and making sure that the certified program has not been changed in any way since its certification, but this could still be very unreliable by itself because of the possibility of falsification and because dangerous behavior of a certified program can be caused for example by error or by some employee that inserts dangerous code on purpose. And even for example a security patch that has been certified and thus can for example update another certified program might still have for example a falsified certificate or for example is legitimate but inadvertently introduces new vulnerabilities. In contrast, the concept of the automatic segregation can make much better use of the Palladium, because by default any program can preferably request services from that safe only for accessing is own segregated world. In other words, Palladium only separates "a trusted area" from a "non-trusted area" but does not offer protection from each other between programs (and their data) within the "trusted area" and between programs and their data within the "non-trusted" area. In addition, the two U.S. patents of Microsoft that seem to be the basis of Palladium (U.S. Pat. Nos. 6,333,670 and 6,327,652) only deal with encryption for protecting files against stealing the contents, but there is no reference to using other forms of protection for example to protect the disk from unauthorized deletion or corruption of the encrypted data. Therefore clearly Palladium (which later was renamed NGSCB—Next Generation Secure Computing Base) at least needs to be improved so that programs that are not trusted preferably cannot have any access whatsoever in the disks (or other nonvolatile storage devices) to data files or directories that belong to trusted programs and to the trusted programs themselves, which preferably includes reading, writing, deleting, etc. (The enforcement of this can be done for example by any of the methods described in the present patent application. In other words, in a variation where a general trusted area and non-trusted area are enforced, preferably for example at least two VEs are created, one for the trusted area and one for the non-trusted area, and the virtual sharing between them is done preferably by any of methods described in the present application. In addition, in this case preferably there is also an OS mode or Update mode where the user and/or the administrator can install applications and/or drivers that need to be used in both areas (or at least in more than one VE). In this OS mode preferably the user can see a merged view of the two VEs and/or for example see the real directory structure, including for example the sub-directories that are used for implementing the two VEs, and/or for example see the view of one of the two VEs (preferably the secure VE). Preferably the system indicates clearly to the user, for example by special desktop wallpaper shapes and/or colors and/or for example by the color of top title bar of various windows, if he is currently in the trusted environment, the untrusted, or the Update mode. For this the system might enforce for example a set of one or more available different wallpapers for the desktop of each environment, or for example add its own markings upon whatever wallpaper the user chooses. Using these methods for enforcing the segregation between for example one or more trusted environments and one or more untrusted environments can be done of course also independently of the palladium or of any palladium-related hardware. Of course, the trusted environments can be for example in a hierarchy of levels, so that for example each trusted environment has a different level of security. When installing the security system in this variation on a computer that already has various applications installed on it, preferably the system automatically creates for the user a list of recommended files that should be migrated to the trusted VE, such as for example Microsoft office files and program source codes. The generation of this list can be created for example by any of the above described heuristics for deciding which types of files or directories are most important and/or by user definitions or pre-defined definitions of these types, and after the user agrees to the list preferably all of the relevant file types and/or directory types are automatically searched and added to the suggested migration list. In addition, if some malicious program for example damages the OS on the untrusted VE, preferably the user can activate a command that can preferably instantly undo the recent changes or for example delete the changed copies of the OS files on that VE so that the original shared OS files reappear in the view of that VE. Preferably it is possible to define separately for each VE what resources are available on it, so that for example the administrator might decide that the CD-R or other removable storage mechanisms or for example any wireless devices or for example specific programs or for example specific system services are not available in the secure VE. Another possible variation is that access to the network is divided so that for example the Internet can only be accessed from applications that are running in the non-trusted area and applications that are running in the trusted area can only access other computers within the internal network of the organization. This can be done for example by a built-in firewall that limits the ranges of IP addresses that can be accessed from each area. Another possible variation is to create for example even just one VE, for example to protect the OS). Another possible variation is to use these environments to enforce much better segregation between users, so that each user preferably has at least one VE of his/her own (For example each user might have just one VE, or for example a number of VEs that belong to him, or for example there is an internal division into separately defined VEs within the user's VE), and/or for example to enforce different profiles or configurations for the same users. This is different from the normal protection between users for example in windows NT or XP or in Unix or other multi-user systems, since in a normal multi-user environment only the administrator can install applications that need to update system files (for example the registry, etc.), so for example for various types of installations users have to login as the administrators, and then what they do affects all the other users. On the other hand, in Windows many types of programs can be installed through the Windows Installer, which gets temporary administrator rights during the installation, and thus, again, the installation can affect the entire computer even if the user is not the administrator. In comparison to this, using at least one special VE for each user allows the user to make whatever changes he wants in the computer without affecting the other users, preferably based on virtual sharing with Copy-On-Write, and thus any viruses or Trojans that succeed entering while he is the active user affect only his current VE. In this variation preferably there is also an update mode, as described above, so that for example special programs that are needed by all the users, such as for example Word, Internet browsers, and other Office programs, etc., are preferably installed in the update mode, so that they need to be installed only once for all the users, but, as explained above, any changes that individual users afterwards make in these installed programs are preferably created only in their own VE, based on virtual sharing. Preferably only one or a few of the users can access the update mode, such as for example the system administrator in a business or company, or for example the parents in homes, so as to reduce the dangers that ordinary users enter the update mode and cause damages on purpose or by mistake (Preferably the user that has rights to access the update mode can also for example specify that certain applications will not be visible to some of the users, as explained above about the possibility to define which resources are available or not available on each VE). These or similar variations can be used also for example in educational institutions, so that for example each student and/or for example each class has its own user-VE (and/or for example the class has a different VE of user VE's, etc.), and/or for example in public-access sites, such as for example Internet Cafés, and/or in other situations where multiple users or multiple groups of users have to share the same PC. The virtual sharing is much more efficient than alternative methods of creating a virtual computer, such as for example emulation, which is very slow, or physically separating the virtual computers on the disks and installing a separate copy of the OS on each virtual computer. Another possible variation is that instead of instantly switching between users (for example by clicking on some icon or pressing some key, as described above for switching for example between the trusted and untrusted VEs), in order to switch users the users have to reboot the computer—this makes the implementation more simple because no services have to be duplicated (see below) and this way the virtual sharing for this is not needed for a large number of objects but only or mainly for storage (file system and registry). However this variation is of course much less preferable since if users have to turn the computer off and on in order to switch users, many users will hate to do it and just keep working from the same user environment. Preferably this separate boot per each user or profile (or other methods of preferably instantly switching between them, such as for example simply clicking an icon or a button, as described above) is in addition to the normal division into users, so that for example once the user enters the computer in the Special VE that he/she desires, he/she can still use within it a system of normally defined users and administrator, etc. (However, some users might find this redundant and unnecessary to have such an additional internal division). Another possible variation is that this is preferably fully integrated within the OS itself, so that for example the experience of division into users and administrator is the same, but the higher separation is enforced by the above methods (i.e. virtual sharing is implemented within the normal user separation mechanism of the OS). Regarding the speed of switching between these VEs (or user VEs), it should be noted that our experiments have shown that in the variations where no boot is required to switch between those VEs, the switching is instantaneous—much faster than switching between users for example in Windows XP. Another possible variation is that the hardware support of the Palladium/NGSCB can be used for example to further ensure that the data in "trusted" areas of the disk cannot be accessed at all by un-trusted software for example even if the computer is booted for example from a diskette or CD with a different OS. This can be done for example by any of the methods described in clause 9 of the reference to FIG. 1, so that for example the CPU will always activate at least part of the security system (or the relevant part of the OS that performs these security functions) even if the system was booted from another source. Another possible variation is that for example the hardware of the CPU and/or the hardware of the disk itself does not allow any access to a file unless the software that tries to access it is identified as its rightful owner, for example by means of providing the appropriate password. This is very different from the concept of needing a password in order to decipher the data in a file, since in the encryption of a file does not protect it from sabotage or from deletion. However, for the reasons explained above, is it much more preferable to enforce the automatic segregation between programs as explained above, and not just create a binary separation between "trusted programs" and "un-trusted programs". Of course the Security System can make use of the trusted area of the Palladium in order to have stronger control. Another possible variation is to use the above suggested hardware enforcement of not having any access to a file without the password to help enforce more easily the automatic segregation, as mentioned above in a variation at the end of clause 9 of the reference to FIG. 1. Another possible variation is to use the automatic segregation in combination with one or more trusted and/or untrusted areas, so that for example the automatic segregation (preferably into VEs) can be done for example separately and/or differently within the "trusted" area and separately and/or differently within the "un-trusted" area, so that for example at least some rules or policies are different between the two areas and/or for example even stricter rules are used if a program in the "un-trusted" area requests from the user to access a file in the "trusted" area, or for example the automatic segregation into automatic VE is activated similarly within each separately defined VE (or for example within each user's VE) or within at least some of them. Of course, various combinations of the above and other variations can also be used.

Another issue is handling various OS services, such as for example print spoolers, MAPI, Windows installer, etc. Since services can work for multiple VEs at the same time and it is also difficult to know for which VE the service is working at a given moment, this might create a security risk, since for example a buffer overflow or other problems in one of the services could cause data to leak between different VEs. In order to solve this preferably at least some services are duplicated so that each VE has a different copy of the thread or process of the service that is running for that VE. However, for efficiency reasons, preferably these services are initially duplicated only into stubs or empty shells (preferably created for example by fork) for each VE in order not to use up resources before they are needed, and preferably the stub or shell is loaded with actual resources only when it becomes needed. This is also one of the possible variations that can be used for example for forcing the VE segregation also on various drivers. Another possible variation is of course that at least some of the services, instead of being duplicated, are regarded as an extension of the OS and thus are preferably treated like other shared resources. This is preferably done at least with specific services which are an integral part of the OS (Such as for example the server and the RPC) and which preferably have a well-known operation. Preferably at least some of the duplication of services is initiated by duplicating for example the services.exe utility of the OS itself during the booting.

Another issue is that in the new Longhorn Microsoft intends to add extensive indexing of files and their contents and/or of other resources on the entire computer, so that the user will be able to carry on efficient searches in a way similar to Internet search engines, and various applications will probably be able to create and/or use these searchable indexes. However, this feature of course may cause conflicts with the requirements of the automatic segregation. Of course, preferably this is solved according to the above described rules and principles, so that preferably only one or a few special applications which are preferably part of the OS or of the Security system are allowed to run such indexing on the entire computer, and preferably normal applications which are limited to their own VE can only create and/or use such index or indexes in their own VE. However, if the Indexing is done for example by special OS applications, then this means that these applications preferably create a separate index for each VE, in addition the global index which is available at the OS view. However this might create some efficiency problems for example when various merges are used, since for each merged view different indexes would have to be merged. Another possible variation is that there is only one or more global indexes that are conducted for example by the appropriate OS or security application, and in this index or indexes preferably each file or resource has a code or mark that indicates the VE to which it belongs, and preferably when accessing this index only the files or other elements that belong to the appropriate VE or VEs are made visible. Of course various combinations of the above and other variations can also be used.

In order to make this more efficient in organizations (for example when installing the security system on computers that already have other software installed on them), preferably one computer can be used for example for learning all of the segregation rules and virtual environment parameters for each program, and this knowledge can be transferred to all the other computers in the organization, without the need to install the Security System before the other applications in the other computers. This last option is preferably used for example in organizations that want to install the security system on computers that are already installed with various programs after the Operating System. So preferably that one computer is installed from the beginning with the security system before any other program is installed on the OS, and then preferably all the other programs that are installed on computers in the organization are installed on it in order to learn the basic rules automatically so that they can be transferred to the other computers in the organization. Another possible variation is that if the Security System is installed on a computer that already has other programs installed on it after the OS, then preferably the Security System is able to cause preferably each installed program to automatically uninstall itself, preferably one program at a time, except that this uninstall is preferably virtual, so that the uninstalling program preferably doesn't really uninstall or doesn't really change anything, but the security system tracks the steps of the attempted uninstall and thus can learn about the associated files and directories and/or other resources, and can preferably move them or parts of them for example to virtual directories and/or files when needed. Of course, this might not work for programs where there is no uninstall information, so as explained above, preferably the Security system can also use various heuristics in order to define the boundaries of VE's of programs that were already installed before the Security System. Of course, if the security system is made part of the operating system itself (for example integrated into it by Microsoft, in case of a Microsoft OS such as windows), then the security system is by definition installed always during the installation of the operating system in all new computers that install this new OS, so by definition it is automatically installed before any other program. Preferably, in this case it is also installed for example before any applications that can access the Internet even if those applications are considered an integral part of the Operating system, such as for example MSIE, Microsoft Media Player, etc., so that for example the VE of these applications can be automatically determined during their installation. Another possible variation is that the security system is installed for example BEFORE the operating system or before most other parts of it. Of course various combinations of the above and other variations can also be used, as explained above. In addition, in systems that are always connected to the Internet even without opening or closing a connection Icon (such as for example some of the ADSL and/or Cable modem systems) there is a problem that the OS might open the connection for example between the network card and the modem for example sometime during the booting process, before the boot has finished and before a normal firewall program is typically even started. This has the danger of leaving the system open to outside attacks even during the boot process itself. So another advantage of the current System is that if it is integrated in the OS and/or is loaded before it then of course it can catch anything even before the boot of the OS itself is complete.

Figure 11B:
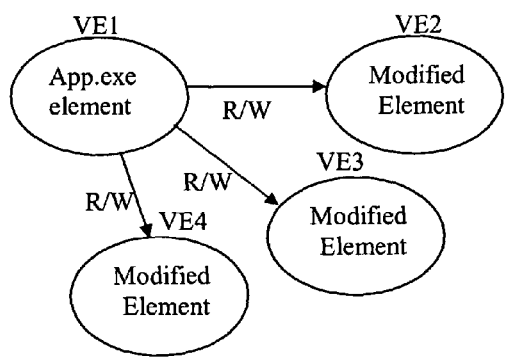
FIGS. 11b-c show in more detail a few preferable implementation variations related to the sharing of files and/or other resources between different VEs and to merging between different VEs.
Figure 11C:
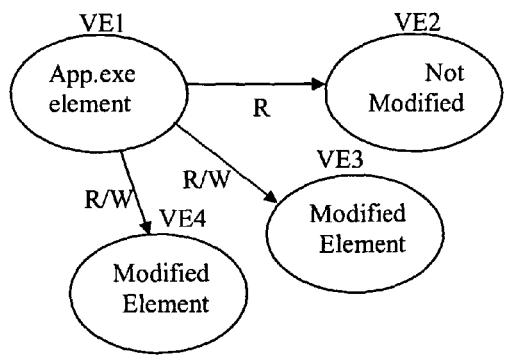

Referring to FIG. 11b-c, we show in more detail a few preferable implementation variations related to the sharing of files and/or other resources between different VEs and to merging between different VEs. As explained above, a Virtual Environment is preferably like a bubble facility that encapsulates in it one or more applications with all the necessary resources that they may need to function, store data, communicate, and perform any other desired action for their intended purpose, based on shared facilities such as operating system, resources, etc. A Program running inside a VE preferably sees only resources available only in the local environment. However, typically a Virtual Environment cannot work by itself—it must have at least some sharing with others, not necessarily equally, for example a program in the VE might have to use common files installed in the operating system, or for example two VEs, transparent to each another, might have to use the same file or other resource. A VE may for example delete or update shared files and/or other resources, but the effect is preferably only contained in its environment. In order to enable this, the updating is preferably done by the Copy-On-Write (or "COW") principle described above. (Another possible variation is that instead of simply copying a file that is changed to the appropriate VE, the system for example can decide to save just the changes, so that for example if just a few bytes are changed in a huge file, only the difference is saved, like a roll-forward buffer (or for example the system can implement Copy-on-Write also on sub-sections of files), and then whenever that file needs to be viewed in the changed version the system can for example preferably automatically provide the correct view of the file with the changes included, for example by creating another temporary copy when the file is needed, or merging the changes on the fly when programs read or write to the file. However, such a method could be problematic and CPU consuming to implement with normal files, unless for example if it is supported by special hardware and/or for example the file system itself is changed to support better different handling of sub-sections of files. In addition, if such implementation is used then preferably the system can automatically decide after a certain amount of changes have accumulated to switch automatically to actually saving a full copy, so that preferably this would be used at most only temporarily or in special cases). (As explained above in clause 8 of the reference to FIG. 1, for example in the registry preferably copy-on-write is used on individual keys, however it is much easier to deal with the keys separately since the keys are independent, so it is more like a directory in which each key is like a file). For deleting files and/or other resources, preferably a similar principle is used, which can be called for example Leave-On-Delete (or "LOD"). When a program in a certain VE deletes a file, there are several possible situations that may occur: 1. The file belongs only to that VE. 2. The file belongs to another VE and may be seen by share (read-only). 3. The file belongs to more than one other VE and may be seen by share (read-only). 4. The file exists in more than one VE in different versions, for example due to Copy-On-Write. Preferably if real deletion cannot be preformed due to VE permissions, it is marked as "Leave On Delete" and thus will not be seen in merges, or in other words the VE that deleted it will continue to see the illusion that is was deleted. If that shared file is subsequently changed in the other VE or VEs where the share exits, preferably the file (and/or other resource) remains unseen by programs in the deleting VE, but if the file is for example subsequently renamed or copied to another file in the shared VE or VEs then preferably it will become visible again also to the deleting VE. Preferably whenever a program or the user needs to see files or directories or resources that are logically on the same place (for example a certain directory) but are actually in a different place (for example because of the Copy-On-Write or for example because of the sub-VEs), all the relevant files are merged into a united view of what the directory structure would be without for example the Copy-On-Write or the sub-VEs.

Preferably if the user drags a file between different VEs it causes the receiving VE to access the dragged-and-dropped file, as if the user allowed it though the dialogue box. Similarly, with file completion objects, such as for example start→run menu, this preferably works normally when used for example from the OS explorer, but when normal programs use this interface they can preferably query only their own VE, and for that a layer of secured object is preferably added. In other words, if a program tries to use this interface, preferably the Security System takes control over this interface, like it does for example with the dialogue box. Similarly, if a program such as for example Microsoft Word or a compiler lets the user choose from a menu to reopen a recent file, this creates the problem that the program might open a file without authorization by the user, since in this case there is no dialogue box. To solve this, one possible variation is that the security system takes control of this too and/or monitors it and thus checks for example if the user really clicked on the file shown to him, or for example the security system overrides this interface with its own implementation of it, however these two solutions might be problematic since unlike the file completion this is not a standard interface. Another possible variation, which is more preferable, is that the Security System for example automatically allows the program to reopen the last N files that it was allowed to open, for example the last 5 files, or any other reasonable number. However, this has the problem that if the program, for example Word, allows the user to pick one of 6 or more files, then if the user picks for example the $6^{th}$ or $7^{th}$ file then the Security System will not allow the access (Preferably by telling Word that the path or file does not exist) and Word will report to the user that the file is not found or the path does not exist, etc. A similar solution is preferably used if for example a browser or a download utility is allowed to automatically complete an interrupted download of one or more files without asking the user explicitly again which files to access. Preferably the security system takes into account also the time that elapsed since the last time that these files were opened by that program and/or for example the time since the last time the user explicitly allowed to open them for example through the dialogue box. Preferably if the executable code of such a program has changed for any reason, it automatically looses these reopen rights, and/or is automatically transferred to another VE, as described for example in the reference to FIG. 1b. (Preferably the time factor is also taken into consideration for example when opening a file normally with the dialog box, since typically after the user chooses a file though the dialog box the program will actually open it for example within a few seconds).

Similarly, if the user activates a program from a command line with one or more parameters that contain a file name or a path, it is preferably regarded by the security system as if the user entered the file name or path from the dialogue box, as is dictated by the above explained principle of regarding user input in a command line as a user authorized activity. Similarly, of course, if the user opens for example a DOS or CMD window and is for example in directory e:\ttt and activates for example the command fgrep.com which is for example in I:\util (and which is found for example according to the "path" searching sequence defined in autoexec.bat), and the file name to be searched is given to fgrep.com as a parameter, the Security System again preferably regards it as a permission by the user to i:\fgrep.com to search the requested file on e:\ttt. Another possible variation is that preferably at least some semantic parsing is done on the command line parameters. On the other hand for example fgrep.com or any other DOS program might for example ask the user which file or files to open, and use for that question for example any graphic or textual format that it pleases. In this case, the Security system preferably handles this in a way similar to the dialogue box, so that for example textual questions and responses are monitored by the security system (for example by monitoring the text screen and preferably including semantic analysis of the displayed text), and graphical questions are for example blocked, and/or other limitations are imposed on programs that user them. Another possible variation is that when the user has to answer DOS programs about file access, he for example clicks on the mouse and thus activates for example the dialogue box that is controlled by the security system.

As explained for example in clause 8 of the reference to FIG. 1, preferably the behavior between virtual environments can use similar principles (for example for virtual sharing and/or for merging) for example for also other resources apart from storage, such as for example registry, graphical subsystems, memory shared areas, etc., although their exact implementation may vary according to the resource.

The possible relationships between resources between 2 VEs for example regarding files are:

None—
  The VE cannot access the other VE. (default)
Read—
  The VE can access another VE for Read only, and other actions preferably lead to Copy-On-Write or Leave-On-Delete.
Modify—
  The VE can write, read, delete and modify the other VE's files.
File Total Access—
  The VE sees a resource based on its name of a global merge, preferably used for example for letting the user see the merged appearance.

When there are multiple sharing relations there may be a problem that there can be multiple versions of the same file, for example because of the Copy-on-Write or because of multiple installations of the same file in the same virtual place (for example in c:\ or in c:\windows), and therefore there can be dilemmas which version should be regarded as the most relevant, which are preferably solved by defining hierarchical scopes of view. For example, if one or more VEs virtually change an existing file for example in c:\ by copy-on-write, according to the above explanations and principles as explained already in other places in this application, the user of course preferably sees in c:\ the original unchanged file, since that file is changed for the user only if the user himself initiates the access to the file or allows a program in a VE to access it for example through the dialogue box. (In other words the first default scope is the OS level). Similarly, if for example a program from some VE creates a real file in c:\ (which means that the user allowed it for example through the dialogue box), then that file is of course seen by the user since it is at the OS scope. On the other hand, if one or more VEs create a virtual file for example in c:\ that exists really only in their own VE, then preferably either the user does not see that file in c:\, or the user can see in c:\ a version of the file according to the order of scopes, so that for example if the file exists in one of the VEs that are created at the administrator level, then preferably the user will see that version of the file, and if the file exists only in one of the VEs that were created in the user level then preferably the user will see that version of the file. Within the administrator level and within the user level, if the file exists in more than one VE, then preferably an additional internal hierarchy of scopes is used, so that for example the version shown will be the version that was most recently updated or for example the earliest version or for example the version of the most recently installed VE, or for example the version from the earliest installed VE. However, allowing the user to see the virtual file as if it really exists in c:\ is at least sometimes less preferable since at least sometimes it can create inconsistency and confusion: In this case for example if the user has an autoexec file of even just two lines, and a virus virtually modifies it through copy-on-write into its own VE, then preferably the user of course sees only the original autoexec file and not the modified file, and this real autoexec file of course takes effect in the user's scope. On the other hand, according to this variation, if the user had previously no other autoexec file then the user will suddenly see the autoexec file of the virus's VE, although it will have no real effect on the OS scope. An even worse problem could occur if for example there are at least some VEs that contain viruses or other malicious programs which decide every day (or for example every hour or any other period) to create and then erase again various files for example in c:\ or for example in c:\windows. This would mean that although there is no real damage in the OS scope, the user might constantly see files appearing and disappearing at least in the shared area of the OS. Another problem that can happen for example if the user did not have an autoexec file and is shown the virtual autoexec file created by a virus as if it exists in c:\, is that the user might for example regard it by mistake as valid file and for example edit it or for example rename it or copy it or for example copy parts of it by cut and paste and then use for example a dangerous part of it in another file (If the user edits it then preferably the real file remains in the VE where it exists, however, if the user for example copies it or a part of it then there is a problem that the new copy could be the real OS scope). Therefore as explained above another possible variation is that the user does not see the virtual file as if it exists in c:\ or does not see it at least in some cases. Anyway, in the variations and/or in the modes where the user and/or the administrator is shown such virtual files as if they really exist in the OS scope, preferably there is at least a preferably clear indication near each such file (and/or directory) if it is a real file or a virtual file, and/or the user can see for example by clicking on the file and/or for example by the color of the file name (or icon) and/or by other indication to which VE it really belongs (The name of the VE is preferably the name of the main directory of that VE). As explained above in the reference to FIGS. 11 & 11a, preferably in the modes or variations where the user sees the real directory structure there is no need to show him in the same mode also the merged view when browsing the directory structure. However, another possible variation is to allow the user to see ALSO the merged files in this mode, but preferably together with the above indication which files are real and which are virtual and preferably also to which VE each belongs. Another possible variation is using similar indications for example also in the start menu and/or in the list of installed programs and/or when viewing the registry and/or when viewing other resources, so that preferably the user can easily know what files and/or programs belong to which VE.

Similarly, if the user deletes the file, for example c:\autoexec.bat, then one possible variation is that it is deleted only in the OS scope. Another possible variation is that it is deleted also in all the other VE's where another copy of the file exists for example at a result of Copy-on-Write, or for example to leave at least some of the other copies of the file, at least in some cases. However, this is less preferable since deleting for example the autoexec file in some other VE might cause the programs there not to function properly. On the other hand, if the user changes the file, then preferably it is changed only in the real file at the OS scope.

Similar principles preferably apply for the VE's point of view. For example, if VE1 has a write access to several other VEs (for example VE2, VE3 and VE4 in FIG. 11b or for example only read access to some of them as in FIG. 11c) and a copy of the same file exists in each of them in a different version, there is again the question of what version should be regarded as the most updated or the most relevant and/or what VE should be updated. Preferably the hierarchy of scopes again applies, so that when VE1 tries to access the resource, preferably a merge of the resources is done by the security system (this component can be called for example VE router), which preferably first looks for the file in VE1 (This is different from the user since in the case of the user preferably the first default is the OS scope, as explained above). If the file is not found there, then it preferably looks for the file in the shared part of the OS, then preferably in shared VEs that were installed by the administrator, and preferably only then in shared VEs that were installed by the user.

This is similar to the merge that the user can preferably see, except that the user and preferably for example explorer and regedit and/or other designed GUI utilities (which preferably have no VE limitations), can preferably see a merge of the same resource from all the VEs at least within the user scope (for example if he has less then root privileges) (for example the registry, file system and/or other resources). This merged view by the user while each application runs in its own VE helps to keep the transparency to the user. Preferably when the system boots, for example, preferably for example the startup files that were installed by all the VE's are started, (preferably being normally merged) except that each runs in his own VE. However, as explained above in the reference to FIGS. 11-11a, another possible variation is that the user (and/or at least the administrator) can see the real directory structure including for example copy-on-write files and sub-VE directories at least when using the explorer or for example browsing directories within a DOS or CMD window, or can for example switch between modes that show it or not, and the merged view is preferably used even in this mode for example at least for viewing the desktop, the list of installed programs in the Start menu, and the registry.

Preferably the divergence between the real directory structure (that includes for example copy-on-write files and sub-VE directories) and the merged view is kept at a necessary minimum, so that for example when a newly installing program requests to create a new directory and the user allows it, preferably the requested directory is really created at the requested path. (Another possible variation is to create the new directory only virtually, which has the advantage of allowing easier management, however that could make the divergence much bigger and is therefore less preferable). As explained above in the reference to FIG. 11, when a newly installing program needs to make changes for example in root drives or in system areas, preferably, unless the user for example explicitly defines it as an update to the OS itself (for example by having to choose special install options in a menu), any changes it makes for example in C:\ and in system areas are based on Virtual sharing, preferably EVEN IF the user allows the program to install itself there through the common dialogue box. However, since new directories are preferably created in the real path, this means that preferably any sub-directories for example in "c:\windows\Program Files" are created indeed in the real path and thus do not become another source of unnecessary divergence. On the other hand, preferably new files in the root drives or in the system areas and changed files are preferably kept in the virtual-share sub-directories in the relevant VE. Similarly, as explained above, preferably if a new program for example requests to install itself in another existing directory, for example in the Pegasus email directory, then if the user allows it through the dialogue box or for example defines it explicitly as an update to Pegasus then the newly installing program can preferably install itself in the real Pegasus directory, otherwise (for example if the newly installing program tries to install itself in the Pegasus directory without even asking the user), then since the program preferably cannot even see the real Pegasus directory, a new empty Pegasus directory is preferably created for it virtually. (Another possible variation is that through the common dialog box the user can allow a program to access only specific files but not to access directories). On the other hand, as explained above, if after installation a new program for example requests to access a certain file for example in C:\ or for example in c:\windows and the user allows it for example through the dialog box, then preferably the program can access the real file. Preferably, in order to identify a new installation even if the program does not use for example a standard install-shield, preferably any first time a new program is run is considered by the Security System as a new installation. In addition, as explained above in other sections, if a program for example installs itself without asking the user anything, although any changes it makes (preferably except creating new directories) are preferably made by virtual sharing, preferably the system first asks the user if he wants to allow the program to install at all. This way, although newly installed programs are limited by default to their own VE, the user knows for example if any browser exploit is trying to install any software on his machine and can prevent it completely.

On the other hand, when dealing for example with copy-on-write versions of the autoexec file, the situation is different, since if programs from various VEs make changes in it, then preferably each change or addition takes effect only within the VE that made it, which can be more problematic. In addition, for example in Windows XP and NT the autoexec file is typically only activated when the user activates a DOS or CMD window or only if the user manually activates it after entering the window. However, for example in Windows 98 or Windows-Me the autoexec file is activated before the Windows loads and takes effect globally. Therefore, one possible solution that is good for both of these types of Windows is that each line (or for example each command within a line in the autoexec file) has a mark (for example within the file or elsewhere) which indicates to which VE it belongs (or for example this is the result of a merged view of the virtual autoexec files), and preferably when executing the autoexec file each program or command will be run within the limitations of the VE that added it to the autoexec file. (In other words, for example in systems like Windows 98 and Windows ME one of the possible variations is that the commands in the merged autoexec file are preferably executed automatically, but preferably each command is executed within the limitations of the VE that added it to the autoexec file, and of course the autoexec file has to be executed only after the Security System is already running). Another possible variation that is relevant for example for windows XP and NT is that when the user enters a DOS or CMD window, the relevant autoexec is automatically executed when the user activates some program that needs it, and preferably all the programs that are activated by it are then limited to the VE of that program. In this variation, if the user for example then activates again the same program or another program in the same VE then the relevant autoexec file is not reactivated but remains in effect from the previous time, and only activating a program from a different VE causes another relevant autoexec to be activated if it exists or is needed. In other words, the rule in this variation is preferably that whenever a program is activated within the DOS or CMD window, if there is an autoexec file that is associated with this VE, it is activated unless it is already active.

Figure 11D:
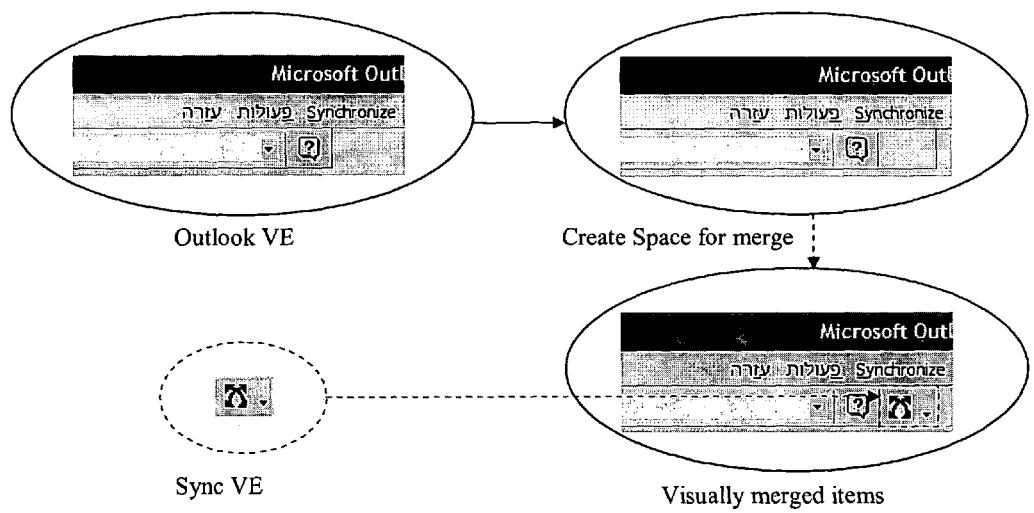
FIGS. 11d-e is an illustration of a preferable way in which embedded objects or plug-ins are executed each at a separate VE but appear visually integrated.
Figure 11E:
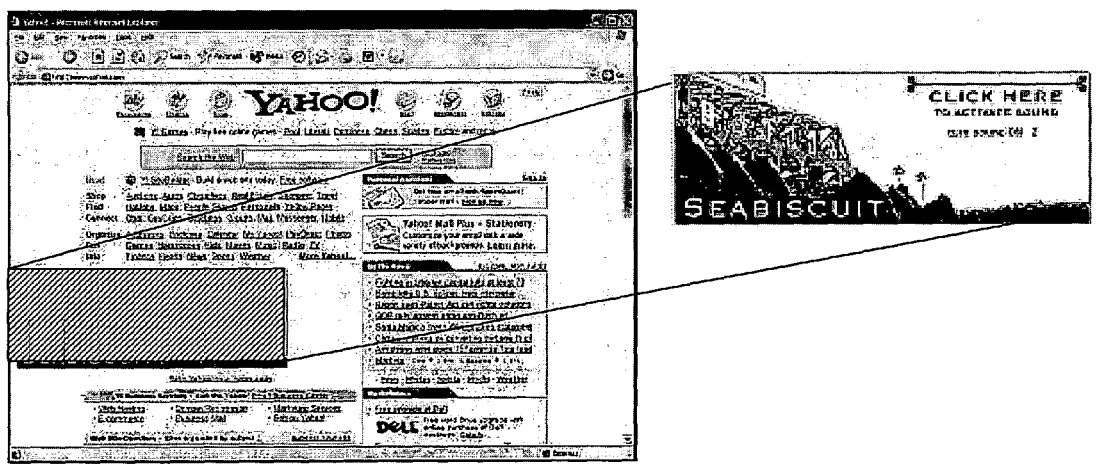

Referring to FIGS. 11d-e, we show a preferable way in which embedded objects or plug-ins are executed each at a separate VE but appear visually integrated. Normally, without VEs, embedded objects or plug-ins cause unwanted code migration. For example, opening an ActiveX object inside Internet Explorer causes the ActiveX to operate in the Internet Explorer's context. Another example: a PGP plug-in for outlook normally runs in outlook's context and will enable a merge of code. In order to prevent this, preferably the Security System creates only visual integration, so that the ActiveX or plug-in appears for example as a button for example in the browser (in the example of FIG. 1d the Sync component appears to be a button in Microsoft Outlook, and in the example of FIG. 11e an isolated ActiveX control appears to be a normal element in the page shown by the browser), but there is no real connection between the two objects other than their internal communication stream, and preferably the security system filters or controls this communication. The visual integration is preferably implemented with the aid of a graphical proxy which makes a combination of programs look as if they are integrated, but in reality they preferably run in different contexts, i.e. in different VEs. In addition, preferably each COM (Component Object Module) server is allowed to run only in one VE, thus avoiding the situation where the same COM server could be giving services at the same time to programs that are on separate VEs.

Figure 12:
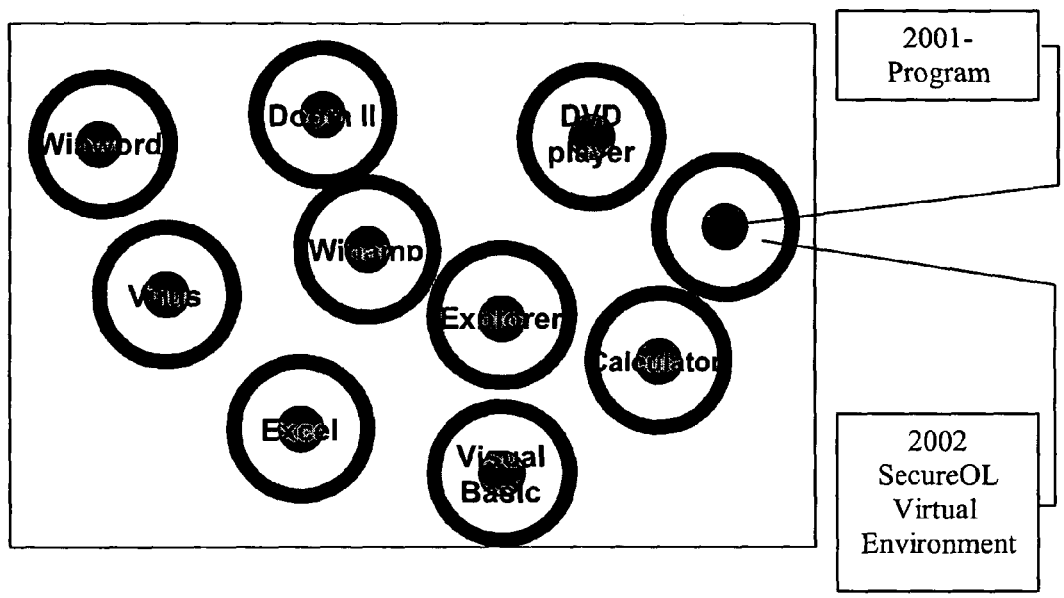
FIG. 12 is another visual illustration of keeping each program in a 'Bubble' of virtual environment.

Referring to FIG. 12, we show another visual illustration of the more extreme implementation of keeping preferably each program in a 'Bubble' of virtual environment, so that the application can preferably only see itself (2001) and not other programs or directories except its virtual environment (2002), which contains the operation system and the resources it is allowed to see.

Preferably only by explicit permission from the user can the program see other programs or directories or their data or access other system resources. Referring to FIG. 13, we show a visual illustration of a preferable configuration in a possible variation in which individual computers in an organization (3001-3005), each with its own installation of the Security System, are connected to the Internet (3020) through the central authority's computer, such as for example the system administrator (3010) (or though another gateway computer, such as for example the network's firewall, which supplies information to the central authority about the amount of data actually sent from each computer), with its own installation of the Security System, so that the Security System on the central authority's computer can also for example notice and intercept communication attempts from computers where the amount of actual communication does not fit the amount reported by the Security System of that computer, as described in the reference to FIG. 1b.

While the invention has been described with respect to a limited number of embodiments, it will be appreciated that many variations, modifications, expansions and other applications of the invention may be made which are included within the scope of the present invention, as would be obvious to those skilled in the art.

We claim:

1. A security system for a computer comprising:
   a. a processor;
   b. a monitoring and capturing system that is configured to conduct, using the processor, constant statistical analyses of various events in the computer to define normal behavior to be able to subsequently identify significant deviations from the normal behavior;
   c. storage;
   d. a security rules database that is configured to store statistics of the normal behavior continuously during operation, the security rules database residing in the storage; and
   e. a user interface that is configured to interact with a user of the computer regarding acceptable behavior patterns and to warn the user of perceived dangers;
   wherein the security system prevents applications and/or drivers from accessing without user permission at least one of Fax sending functions and other TAPI functions.

2. The system of claim 1 wherein by default a monitored program is segregated within a Virtual Environment (VE).

3. The system of claim 2 wherein the user sees a merged view of the desktop regardless of the VE (Virtual Environment) boundaries.

4. The system of claim 2 wherein when running virus-scan programs, the virus-scan program can access freely all the real files and directories.

5. The system claim 2 wherein embedded objects or plug-ins are executed each at a separate VE but appear visually integrated.

6. The system of claim 2 wherein separate VEs with virtual sharing are used to enforce better segregation between users, so that each user has at least one VE of his/her own, and/or to enforce different profiles or configurations for the same users.

7. The system of claim 1 wherein virtual sharing is done so that, unless explicitly allowed by the user, when an executable tries to change a shared resource, it is given the illusion that it has accessed it, but in reality the executable is redirected to a separate private sub-directory which only it can access.

8. The system of claim 1 wherein at least one general trusted area and at least one non-trusted area are enforced by creating at least two VEs, one for the trusted area and one for the non-trusted area, and enforcing the virtual sharing of resources between them, so that each VE sees only itself and the OS.

9. A security system for a computer comprising:
a. a processor;
b. a monitoring and capturing system that is configured to conduct, using the processor, constant statistical analyses of various events in the computer to define normal behavior to be able to subsequently identify significant deviations from the normal behavior;
c. storage;
d. a security rules database that is configured to store statistics of the normal behavior continuously during operation, the security rules database residing in the storage; and
c. a user interface that is configured to interact with a user of the computer regarding acceptable behavior patterns and to warn the user of perceived dangers;
wherein the security system prevents applications and/or drivers from accessing without user permission also USB devices.

10. A security system for a computer comprising:
a. a processor;
b. a monitoring and capturing system that is configured to conduct, using the processor, constant statistical analyses of various events in the computer to define normal behavior to be able to subsequently identify significant deviations from the normal behavior;
c. storage;
d. a security rules database that is configured to store statistics of the normal behavior continuously during operation, the security rules database residing in the storage; and
c. a user interface that is configured to interact with a user of the computer regarding acceptable behavior patterns and to warn the user of perceived dangers;
wherein the security system prevents applications and/or drivers from accessing without user permission also at least one of Bluetooth communication devices, infrared, and other wireless communication channels.

11. The security system of claim 1, wherein the deviations from the normal behavior include sending out significantly more data than usual.

12. The security system of claim 1, wherein the deviations from the normal behavior include accessing more files than usual.

13. The security system of claim 1, wherein the monitoring and capturing system monitors programs that have been authorized for use of the communication channels.

* * * * *